(12) United States Patent
Kokkinos et al.

(10) Patent No.: US 11,430,247 B2
(45) Date of Patent: Aug. 30, 2022

(54) IMAGE GENERATION USING SURFACE-BASED NEURAL SYNTHESIS

(71) Applicant: Snap Inc., Santa Monica, CA (US)

(72) Inventors: Iason Kokkinos, London (GB); Georgios Papandreou, London (GB); Riza Alp Guler, London (GB)

(73) Assignee: Snap Inc., Santa Monica, CA (US)

( * ) Notice: Subject to any disclaimer, the term of this patent is extended or adjusted under 35 U.S.C. 154(b) by 86 days.

(21) Appl. No.: 16/949,773

(22) Filed: Nov. 13, 2020

(65) Prior Publication Data

US 2021/0150197 A1    May 20, 2021

Related U.S. Application Data

(60) Provisional application No. 62/936,328, filed on Nov. 15, 2019.

(51) Int. Cl.
*G06V 40/10* (2022.01)
*G06F 17/18* (2006.01)
(Continued)

(52) U.S. Cl.
CPC ............ *G06V 40/103* (2022.01); *G06F 17/18* (2013.01); *G06K 9/629* (2013.01); *G06K 9/6215* (2013.01);
(Continued)

(58) Field of Classification Search
CPC .... G06V 40/103; G06V 20/647; G06F 17/18; G06K 9/6215; G06K 9/629; G06T 5/50;
(Continued)

(56) References Cited

U.S. PATENT DOCUMENTS 11,024,060 B1 *  6/2021  Ma .................. G06V 40/103
2019/0220992 A1 *  7/2019  Li .................... G06N 3/0454
(Continued)

FOREIGN PATENT DOCUMENTS

WO     2021094526     5/2021

OTHER PUBLICATIONS

Guler et al., "HoloPose: Holistic 3D Human Reconstruction In-The-Wild", Proceedings of the IEEE/CVF Conference on Computer Vision and Pattern Recognition (CVPR), Jun. 2019 (Year: 2019).*
(Continued)

*Primary Examiner* — Aaron W Carter
(74) *Attorney, Agent, or Firm* — Schwegman Lundberg & Woessner, P.A.

(57) ABSTRACT

Aspects of the present disclosure involve a system and a method for performing operations comprising: receiving a two-dimensional continuous surface representation of a three-dimensional object, the continuous surface comprising a plurality of landmark locations; determining a first set of soft membership functions based on a relative location of points in the two-dimensional continuous surface representation and the landmark locations; receiving a two-dimensional input image, the input image comprising an image of the object; extracting a plurality of features from the input image using a feature recognition model; generating an encoded feature representation of the extracted features using the first set of soft membership functions; generating a dense feature representation of the extracted features from the encoded representation using a second set of soft membership functions; and processing the second set of soft membership functions and dense feature representation using a neural image decoder model to generate an output image.

20 Claims, 13 Drawing Sheets
(5 of 13 Drawing Sheet(s) Filed in Color)

(51) Int. Cl.
  *G06K 9/62* (2022.01)
  *G06T 5/50* (2006.01)
  *G06V 20/64* (2022.01)

(52) U.S. Cl.
  CPC .............. *G06T 5/50* (2013.01); *G06V 20/647* (2022.01); *G06T 2207/20084* (2013.01)

(58) Field of Classification Search
  CPC ........... G06T 2207/20084; G06T 15/04; G06T 11/001
  See application file for complete search history.

(56) References Cited

U.S. PATENT DOCUMENTS

| | | | | |
|---|---|---|---|---|
| 2019/0259136 | A1* | 8/2019 | Shpalensky | G06V 10/82 |
| 2019/0370648 | A1* | 12/2019 | Zoph | G06N 3/082 |
| 2020/0111233 | A1* | 4/2020 | Thyagharajan | G06T 7/246 |
| 2020/0175375 | A1* | 6/2020 | Chen | G06N 20/00 |
| 2020/0184721 | A1* | 6/2020 | Ge | G06N 3/0454 |
| 2021/0150197 | A1* | 5/2021 | Kokkinos | G06K 9/6215 |
| 2021/0150806 | A1* | 5/2021 | Guler | G06T 17/00 |
| 2021/0241522 | A1* | 8/2021 | Guler | G06K 9/627 |
| 2021/0271866 | A1* | 9/2021 | Hayakawa | G06N 3/0454 |
| 2021/0334993 | A1* | 10/2021 | Woodford | G06T 7/55 |
| 2021/0350621 | A1* | 11/2021 | Bailey | G06T 17/20 |
| 2021/0358197 | A1* | 11/2021 | Shysheya | G06T 15/205 |
| 2021/0398351 | A1* | 12/2021 | Papandreou | G06N 20/00 |
| 2021/0407163 | A1* | 12/2021 | Chai | G06N 3/0454 |
| 2022/0101608 | A1* | 3/2022 | Hu | G06K 9/6215 |

OTHER PUBLICATIONS

Guler et al. "DensePose: Dense Human Pose Estimation In The Wild", Feb. 2018 (Year: 2018).*

"International Application Serial No. PCT/EP2020/082047, International Search Report dated Feb. 12, 2021", 4 pgs.

"International Application Serial No. PCT/EP2020/082047, Written Opinion dated Feb. 12, 2021", 6 pgs.

Aliaksandra, Shysheya, "Textured Neural Avatars", 2019 IEEE CVF Conference on Computer Vision and Pattern Recognition (CVPR), IEEE, (Jun. 15, 2019), 2382-2392.

Neverova, N, "Dense Pose Transfer", Lecture Notes in Computer Science—Computer Vision—ECCV 2018—15th European Conference vol. 11207 LNC, (2018), 128-143.

* cited by examiner

IMAGE GENERATION USING SURFACE-BASED NEURAL SYNTHESIS

CLAIM FOR PRIORITY

This present application claims the benefit of priority to U.S. Provisional Application No. 62/936,328, filed Nov. 15, 2019, which is herein incorporated by reference in its entirety.

TECHNICAL FIELD

The present disclosure relates to the use of continuous surface-level parametrizations of objects to synthesize images.

BACKGROUND

Modern day user devices provide messaging applications that allow users to exchange messages with one another. Such messaging applications have recently started incorporating graphics in such communications. The graphics can include avatars or cartoons that mimic user actions.

BRIEF DESCRIPTION OF THE SEVERAL VIEWS OF THE DRAWINGS

The patent or application file contains at least one drawing executed in color. Copies of this patent or patent application publication with color drawing(s) will be provided by the Office upon request and payment of the necessary fee.

In the drawings, which are not necessarily drawn to scale, like numerals may describe similar components in different views. To easily identify the discussion of any particular element or act, the most significant digit or digits in a reference number refer to the figure number in which that element is first introduced. Some nonlimiting examples are illustrated in the figures of the accompanying drawings in which.

DETAILED DESCRIPTION

Figure 1:
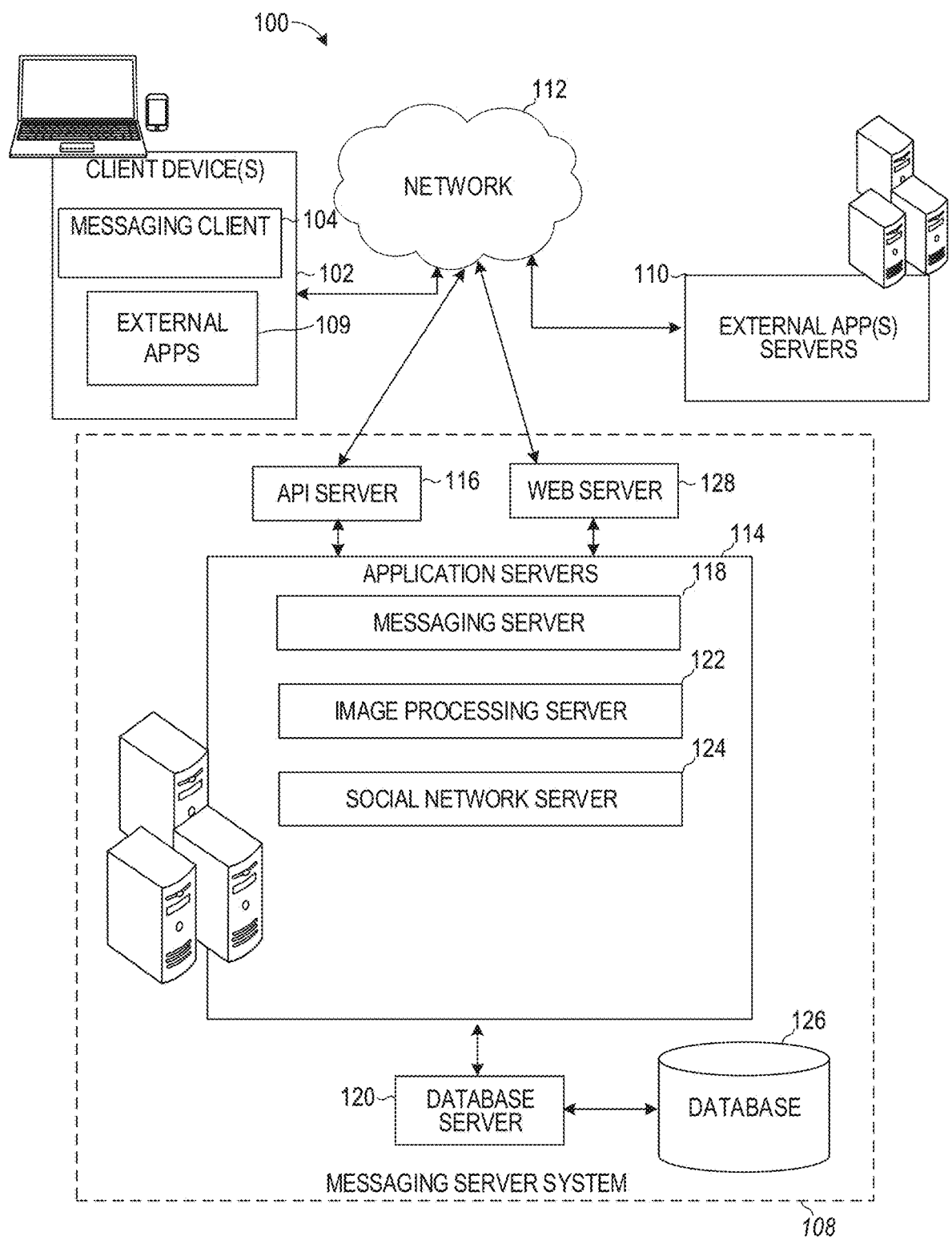
FIG. 1 is a diagrammatic representation of a networked environment in which the present disclosure may be deployed, in accordance with some examples.

The description that follows includes systems, methods, techniques, instruction sequences, and computing machine program products that embody illustrative examples of the disclosure. In the following description, for the purposes of explanation, numerous specific details are set forth in order to provide an understanding of various examples. It will be evident, however, to those skilled in the art, that examples may be practiced without these specific details. In general, well-known instruction instances, protocols, structures, and techniques are not necessarily shown in detail.

Neural image synthesis can be controlled by conditioning the operation of a network on a given signal, which can be a categorical label, text, or layout constraints indicated by another image. Typical systems learn a fully disentangled image synthesis by combining 3D and 2D datasets or unstructured 2D image sets, allowing one to explicitly control camera, shape, and illumination parameters. When focusing on humans, the conditioning signal can include human keypoints, semantic parts, or DensePose-level information. Typically, this is done by encoding this information as additional input channels which are concatenated with the RGB image and fed to a CNN, or by using pose information in conjunction with a Spatial Transformer that densely warps RGB values or neuron activations.

The disclosed examples improve the accuracy of neural synthesis models and make such models more controllable by exploiting continuous, surface-level parameterizations of object category shape, focusing in particular on humans. Specifically, according to the disclosed examples, a charted, UV coordinate-based representation of humans is used to improve image synthesis in terms of both controllability and realism. The charting is integrated in two complementary approaches to image synthesis; parametric generative models such as principal component analysis (PCA) or AutoEncoders, where an explicit image encoding determines image synthesis; and descriptive models, where an image is synthesized through moment matching so as to be statistically indistinguishable from a target signal. As a parametric model, the disclosed examples use a semantic conditioning signal to modulate a decoder's behavior through Adaptive Instance Normalization. As a descriptive model a Universal Transfer method is used which applies the colorization-and-whitening (CWT) transform to match the Gram Matrices of a content and a style signal.

Specifically, a 2D input image is received and features of the input image are obtained. The features are pooled and assigned to different channels depending on the region-specific appearance information, such as hair color and style around faces or show type around feet. This information is compressed and a membership-weighted estimate of means and variance is applied per channel. As an example, every row of a matrix corresponds to one human joint. To construct this matrix, we obtain features defined for the image and for every joint, the disclosed examples emphasized those features that are likely to contain the joint into the corresponding matrix row. A target image, such as an image depicting a different pose is received. The target image is processed by obtaining pixel values of different regions of the image based on a dense pose function. As an example, a region of the target image corresponding to a shoulder landmark is analyzed to obtain a set of pixel values associated with that region of the target image. These pixel values are assigned as target soft intrinsic distances. These soft intrinsic distances are concatenated with the pooled features of the input image and decoded to generate a decoded image in which the input image appears with features of the target image. For example, the input image depicting a person in one pose is decoded to generate an output image in which the person is depicted in another pose.

According to a first aspect, this disclosure describes a computer implemented method of neural image synthesis, the method comprising: receiving a two-dimensional continuous surface representation of a three-dimensional object, the continuous surface comprising a plurality of landmark locations; determining a first set of soft membership functions based on relative location of points in the two-dimensional continuous surface representation and the landmark locations; receiving a two-dimensional input image, the input image comprising an object of the same type as the three-dimensional object; extracting a plurality of features from the input image using a feature recognition model; generating an encoded feature representation of the extracted features using the first set of soft membership functions; generating a dense feature representation of the extracted features from the encoded representation using a second set of soft membership functions; and processing the second set of soft membership functions and dense feature representation using a neural image decoder model to generate an output image.

A two-dimensional continuous surface representation of a three-dimensional object comprises a map of the surface of a three-dimensional object onto a two-dimensional planar region. It may also be referred to as a "charting". The representation is continuous in the sense that the two-dimensional representation of the object is not disjoint, i.e. different elements of the object are not split up into separate two-dimensional representations. In some examples, such a mapping is obtained by effectively "unwrapping" and "flattening" the three-dimensional surface into two dimensions. This unwrapping process may not fully fill an area used for the two-dimensional continuous surface representation—the remaining portion of the area may be referred to as the "background". The two-dimensional continuous surface representation may itself be in the form of an image. An example of such a two-dimensional continuous surface representation is a UV map that may be generated from a three-dimensional object using UV unwrapping techniques. Other equivalent representations may alternatively be used.

Determining the first set of soft membership functions may comprise: determining distances between a plurality of points in the two-dimensional continuous surface representation and the landmark locations; and assigning each point in the plurality of points to a landmark based on the determined distances.

The sets of soft membership functions are functions that associate points (e.g. pixels) in the two-dimensional continuous surface representation to one or more of the landmarks. In effect, the soft membership functions correspond to regions that roughly position locations on the object. A background membership function may also be included in the set that assigns points in the two-dimensional continuous surface representation that are determined not to be on the object to a background label. In some examples, the soft feature representation assigns each point to its nearest landmark. In other examples, the soft feature representation assigns a set of weights to each point, each weight associated with a different landmark and based on the distance to said landmark, e.g. the greater the distance, the smaller the weight.

Determining the landmark locations may comprise using a landmark recognition model.

The landmarks (also referred to as "object landmarks") may represent keypoints of the object. The landmarks may be specific to an object type. For example, in examples where the object is a human body, the landmarks may be keypoints of the human body, such as joints, facial features etc. The object landmarks may be labelled/located manually, or may be labelled/located using a landmark recognition/location model (for example, a neural network trained to locate landmarks in the two-dimensional continuous surface representations of particular object types).

The neural image decoder model may comprise a convolutional neural network conditioned on the two-dimensional continuous surface representation.

Generating an encoded feature representation of the extracted features using the first set of soft membership functions comprises performing a membership-weighted estimate of a mean and variance for each channel of the extracted features. The encoded representation may comprise an estimate of the mean and variance for each channel of the extracted features, i.e. feature statistics in the vicinity of the landmarks.

Generating a dense feature representation of the extracted features from the encoded representation using a second set of soft membership functions may comprise applying a dual operation to the membership-weighted estimate of a mean and variance for each channel of the extracted features.

The dense feature representation may also be referred to as a "feature field" or "pixelate representation". Soft feature unpooling may be used to generate the dense feature representation, i.e. an inverse/dual operation to soft feature pooling. The unpooling effectively spreads features in the encoded feature representation over the corresponding areas of an image. In other word, it broadcasts the encoding back into an image domain.

In some examples, the first set of soft membership functions and the second set of soft membership functions are the same. The method may further comprise: generating a three-dimensional model/representation of the three-dimensional object from the input image; and generating the two-dimensional continuous surface representation from the three-dimensional model/representation. The method may further comprise modifying values in the encoded representation prior to generating the dense feature representation.

Re-using the first set of soft membership functions to generate a dense feature representation that allows shape and appearance information in an input image to be disentangled, providing a means for independent control/variation of shape and appearance during image generation.

A three-dimensional model/representation, such as a DensePose representation, may be determined from the input image, and then used to generate the two-dimensional continuous surface representation, for example using UV unwrapping. The two-dimensional continuous surface representation then corresponds to the input image.

The two-dimensional continuous surface representation of a three-dimensional object may be generated from the input image. The method may further comprise: receiving a further two-dimensional input image, the further input image comprising a further object of the same type as the three-dimensional object; generating a further two-dimensional continuous surface representation of said three-dimensional object from the further two-dimensional input image, the further continuous surface comprising the plurality of landmark locations; and determining the second set of soft membership functions based on relative locations of points in the further two-dimensional continuous surface representation and the landmark locations.

Determining the first set of soft membership functions from the input image and the second set of soft membership functions from a different input image allows pose/style information to be transferred from one image to the other. For example, the (first) input image may comprise an image of an object (e.g. a human) in a first pose, and be used to determine the first set of soft membership functions. The second input image may comprise an image of an object (e.g. human) in a second pose, and be used to determine the second set of soft membership functions. Extracting features from the first image and generating the encoded representation of them with the first set of soft membership functions associates features of the first image with the object landmarks. Unpooling the encoded representation of the features of the first image with the second set of soft membership functions to generate the dense representation effectively transfers features of the first image onto an image with the pose of the second image.

Generating the further two-dimensional continuous surface representation from the further (i.e. second) image may be performed in the same way as generating the two-dimensional continuous surface representation from the input (i.e. first) image.

The input image may comprise an image of the object in a first pose and the further input image may comprise an image of the further object in a second pose. The second image may comprise portions corresponding to unseen portions of the first image. Generating the two-dimensional continuous surface representation from the input image may comprise generating portions of the two-dimensional continuous surface representation corresponding to the unseen portions of the first image from the encoded representation using a learned attention mechanism. The learned attention mechanism may be based on the first set of soft membership functions.

When the input (i.e. first) image and further (i.e. second) image show an object in a different pose, there may be regions of the second image that are not present in the first image, and therefore cannot be directly transferred from the first image. These regions can be interpolated from the first image using a learned attention mechanism. The observed features of the first image (i.e. the extracted features) can be diffused across the landmarks to generate a diffuse set of features using a learned model, such as a matrix or a neural network with learned weights, parameters and/or components. An attention mechanism is used to generate a refined set of features by combing the diffuse set of features and the observed set of features to prevent the diffuse set of features from overriding the observed features.

According to another aspect, this disclosure describes a computer implemented method of style transfer, the method comprising: determining a set of content features from a source image using an encoder neural network; determining a set of style features from a style image using the encoder neural network; determining position dependent content features using joint statistics of position and content features in regions of the source image; determining position dependent style features using joint statistics of position and style features in regions of the style image; generating a set of transformed content features from the set of position dependent content features based on the joint statistics of position and content features; generating a set of transformed style features from the set of transformed content features based on the joint statistics of position and style features; and generating an output image from the transformed set of style features and the transformed set of content features using a decoder neural network.

The method may provide an enhancement to other descriptive methods, such as the whitening and color transformation, by taking into account non-stationary patterns in the input images using the position dependent style and content features.

The content features and style features may be determined from the source and style images respectively using a feature recognition neural network. An example of such a network is the VGG network, though other feature recognition networks may alternatively be used. The decoder neural network may be an neural network trained to reproduce images from feature maps produced by the feature recognition neural network. Together, the feature recognition neural network and the decoder neural network may form an autoencoder system.

The style image and/or source image comprises a continuous two-dimensional representation of a three-dimensional object, as described above in relation to the first aspect.

The joint statistics of position and content features comprise a content feature mean, a content position mean and covariances between content features and content positions, and wherein determining position dependent content features comprises determining a conditional model of the content features conditioned on position. The conditional model of the content features may comprise a position dependent content mean and a conditional content covariance. Generating the set of transformed content features from the set of position dependent content features may comprise: centering the position dependent content features based on the position dependent content mean; and applying a whitening transformation based on the conditional content covariance.

The joint statistics of position and style features may comprise a style feature mean, a style position mean and covariances between style features and style positions, and wherein determining position dependent style features comprises determining a conditional model of the style features conditioned on position. The conditional model of the style features may comprise a position dependent style mean and a conditional style covariance. Generating the set of transformed style features from the set of position dependent content features may comprise: adding the position dependent content features to the position dependent style mean; and applying a coloring transformation based on the conditional style covariance.

A model, such as a multivariate Gaussian model, may be used to capture the dependence of the extracted content/style features on continuous position coordinates. This model may be used to replace the static content/style features used in other descriptive synthesis models, such as the whitening and color transformation. Whitening refers to the reduction of style features present in the content features. Coloring refers to adding style features from the style image to the (whitened) content features of the source image.

The method may further comprise: mapping the source/style image to an embedding using a trained model; and determining the joint statistics of position and content/style features in regions of the source/style image based on the embedding.

Use of an embedding of the position coordinates instead of the position coordinates themselves can allow complex spatial dependencies to be captured. For example, in humans it is expected that there will be mirror symmetry about the vertical axis, but not a horizontal axis. Features will therefore be more correlated in the horizontal direction than the vertical direction. The model may be trained based on a loss function that penalizes distances in the vertical direction more than distances in the horizontal direction when generating the mapping.

Networked Computing Environment

FIG. 1 is a block diagram showing an example messaging system 100 for exchanging data (e.g., messages and associated content) over a network. The messaging system 100 includes multiple instances of a client device 102, each of which hosts a number of applications, including a messaging client 104 and other external applications 109 (e.g., third-party applications). Each messaging client 104 is communicatively coupled to other instances of the messaging client 104 (e.g., hosted on respective other client devices 102), a messaging server system 108 and external app(s) servers 110 via a network 112 (e.g., the Internet). A messaging client 104 can also communicate with locally-hosted third-party applications 109 using Applications Program Interfaces (APIs).

A messaging client 104 is able to communicate and exchange data with other messaging clients 104 and with the messaging server system 108 via the network 112. The data exchanged between messaging clients 104, and between a messaging client 104 and the messaging server system 108, includes functions (e.g., commands to invoke functions) as well as payload data (e.g., text, audio, video or other multimedia data).

The messaging server system 108 provides server-side functionality via the network 112 to a particular messaging client 104. While certain functions of the messaging system 100 are described herein as being performed by either a messaging client 104 or by the messaging server system 108, the location of certain functionality either within the messaging client 104 or the messaging server system 108 may be a design choice. For example, it may be technically preferable to initially deploy certain technology and functionality within the messaging server system 108 but to later migrate this technology and functionality to the messaging client 104 where a client device 102 has sufficient processing capacity.

The messaging server system 108 supports various services and operations that are provided to the messaging client 104. Such operations include transmitting data to, receiving data from, and processing data generated by the messaging client 104. This data may include message content, client device information, geolocation information, media augmentation and overlays, message content persistence conditions, social network information, and live event information, as examples. Data exchanges within the messaging system 100 are invoked and controlled through functions available via user interfaces (UIs) of the messaging client 104.

Turning now specifically to the messaging server system 108, an Application Program Interface (API) server 116 is coupled to, and provides a programmatic interface to, application servers 114. The application servers 114 are communicatively coupled to a database server 120, which facilitates access to a database 126 that stores data associated with messages processed by the application servers 114. Similarly, a web server 128 is coupled to the application servers 114, and provides web-based interfaces to the application servers 114. To this end, the web server 128 processes incoming network requests over the Hypertext Transfer Protocol (HTTP) and several other related protocols.

The Application Program Interface (API) server 116 receives and transmits message data (e.g., commands and message payloads) between the client device 102 and the application servers 114. Specifically, the Application Program Interface (API) server 116 provides a set of interfaces (e.g., routines and protocols) that can be called or queried by the messaging client 104 in order to invoke functionality of the application servers 114. The Application Program Interface (API) server 116 exposes various functions supported by the application servers 114, including account registration, login functionality, the sending of messages, via the application servers 114, from a particular messaging client 104 to another messaging client 104, the sending of media files (e.g., images or video) from a messaging client 104 to a messaging server 118, and for possible access by another messaging client 104, the settings of a collection of media data (e.g., story), the retrieval of a list of friends of a user of a client device 102, the retrieval of such collections, the retrieval of messages and content, the addition and deletion of entities (e.g., friends) to an entity graph (e.g., a social graph), the location of friends within a social graph, and opening an application event (e.g., relating to the messaging client 104).

The application servers 114 host a number of server applications and subsystems, including for example a messaging server 118, an image processing server 122, and a social network server 124. The messaging server 118 implements a number of message processing technologies and functions, particularly related to the aggregation and other processing of content (e.g., textual and multimedia content) included in messages received from multiple instances of the messaging client 104. As will be described in further detail, the text and media content from multiple sources may be aggregated into collections of content (e.g., called stories or galleries). These collections are then made available to the messaging client 104. Other processor- and memory-intensive processing of data may also be performed server-side by the messaging server 118, in view of the hardware requirements for such processing.

Figure 2:
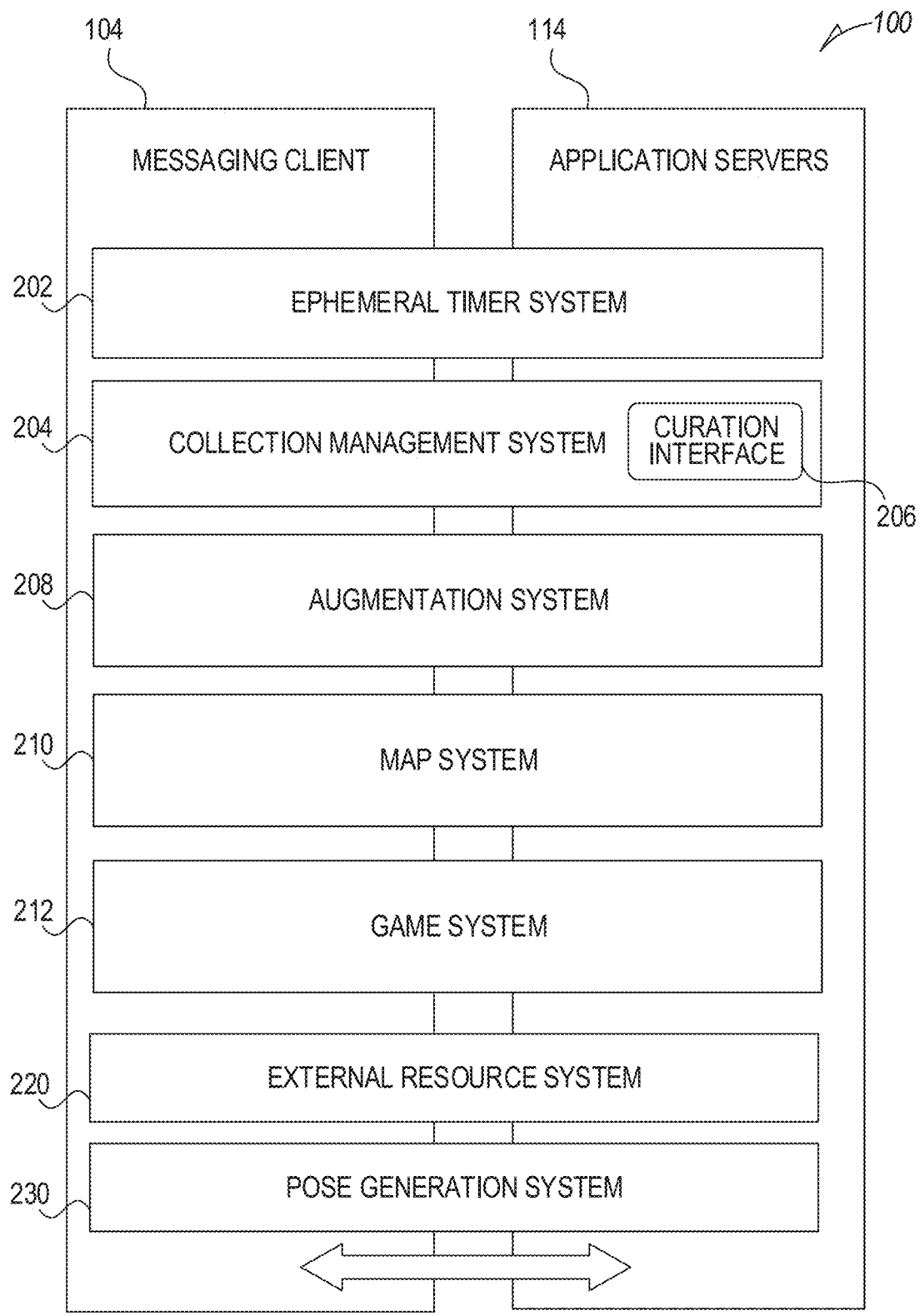
FIG. 2 is a diagrammatic representation of a messaging system, in accordance with some examples, that has both client-side and server-side functionality.

The application servers 114 also include an image processing server 122 that is dedicated to performing various image processing operations, typically with respect to images or video within the payload of a message sent from or received at the messaging server 118. Detailed functionality of the image processing server 122 is shown and described in connection with FIG. 5. Image processing server 122 is used to implement 3D body model generation operations of the 3D body model generation system 230 (FIG. 2).

In one example, the image processing server 122 detects a person in an input 2D image. The image processing server 122 also receives a target image of the person or another person in a different pose than the person in the 2D image. The image processing server 122 uses the target image to generate an output image that depicts the person in the input 2D image in the pose of the person in the target image. In some cases, the image processing server 122 uses a charted adaptive instance normalization (CHAIN) to perform this pose transfer. Specifically, Adaptive Instance Normalization (AdaIN) modifies the statistics of each channel c in a feature map through a parametric function such as a multi-layer perceptron:

$$AdaIN(x_i^c) = \gamma_c \frac{x_i - \mu_c}{\sigma_c} + \beta_c,$$

where $x_i$ denotes the activation at position i, μ, σ are computed by standard Instance Normalization, and γ, β are multiplicative and additive gain terms that are predicted by a side branch as to appropriately modify the network's behavior. AdaIN is applied to multiple levels of a decoder and it is shown that the values of γ, β at different network depths provide a natural disentanglement of structure hierarchies. The image processing server 122 according to some examples determines spatially-varying instance normalization parameters γ, β modulated by the continuous surface representation. Specifically, CHAIN uses both the input image and surface-based interpretation to construct the conditioning signal:

$$ChAIN(x_i^c) = \gamma_{c_i} \frac{x_i - \mu_c}{\sigma_c} + \beta_{c_i}, \gamma_{c_i} = MLP(I, UV)_i$$

The conditioning signal is designed to disentangle shape and appearance. This allows the image processing server 122 to in a second stage synthesize the pose of a person with the clothes of another, or easily perform appearance inpainting. The conditioning signal is constructed by first eliciting localized shape and appearance descriptors, and then fusing them in a dense conditioning signal that is processed by a CNN that regresses $c_i$, $b_i$ per channel. Training of the CHAIN system implemented by the image processing server 122 is discussed in connection with FIG. 5 below.

Figure 3:
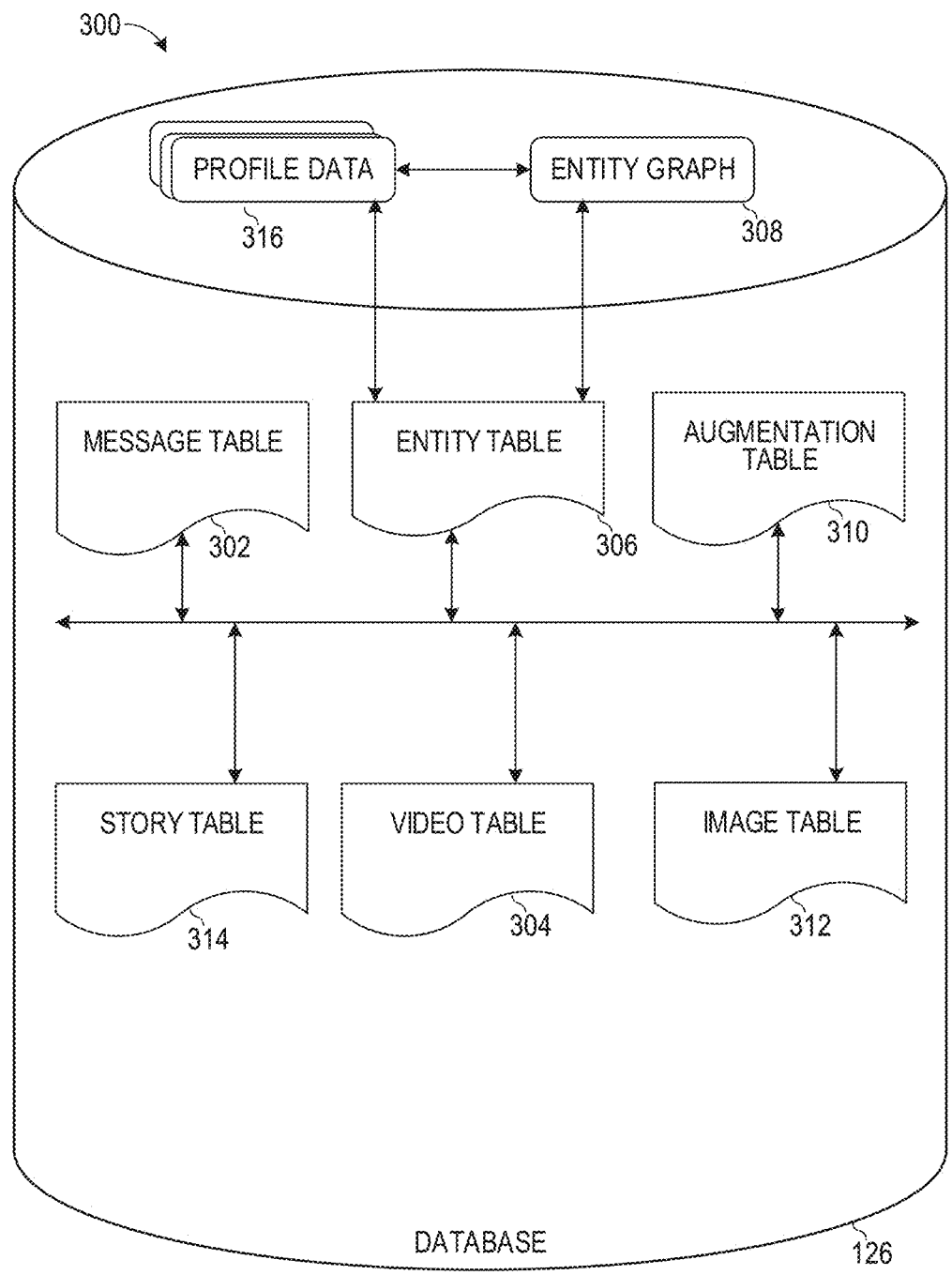
FIG. 3 is a diagrammatic representation of a data structure as maintained in a database, in accordance with some examples.

The social network server 124 supports various social networking functions and services and makes these functions and services available to the messaging server 118. To this end, the social network server 124 maintains and accesses an entity graph 308 (as shown in FIG. 3) within the database 126. Examples of functions and services supported by the social network server 124 include the identification of other users of the messaging system 100 with which a particular user has relationships or is "following," and also the identification of other entities and interests of a particular user.

Returning to the messaging client 104, features and functions of an external resource (e.g., a third-party application 109 or applet) are made available to a user via an interface of the messaging client 104. The messaging client 104 receives a user selection of an option to launch or access features of an external resource (e.g., a third-party resource), such as external apps 109. The external resource may be a third-party application (external apps 109) installed on the client device 102 (e.g., a "native app"), or a small-scale version of the third-party application (e.g., an "applet") that is hosted on the client device 102 or remote of the client device 102 (e.g., on third-party servers 110). The small-scale version of the third-party application includes a subset of features and functions of the third-party application (e.g., the full-scale, native version of the third-party standalone application) and is implemented using a markup-language document. In one example, the small-scale version of the third-party application (e.g., an "applet") is a web-based, markup-language version of the third-party application and is embedded in the messaging client 104. In addition to using markup-language documents (e.g., a .*ml file), an applet may incorporate a scripting language (e.g., a .*js file or a .json file) and a style sheet (e.g., a .*ss file).

In response to receiving a user selection of the option to launch or access features of the external resource (external app 109), the messaging client 104 determines whether the selected external resource is a web-based external resource or a locally-installed external application. In some cases, external applications 109 that are locally installed on the client device 102 can be launched independently of and separately from the messaging client 104, such as by selecting an icon, corresponding to the external application 109, on a home screen of the client device 102. Small-scale versions of such external applications can be launched or accessed via the messaging client 104 and, in some examples, no or limited portions of the small-scale external application can be accessed outside of the messaging client 104. The small-scale external application can be launched by the messaging client 104 receiving, from a external app(s) server 110, a markup-language document associated with the small-scale external application and processing such a document.

In response to determining that the external resource is a locally-installed external application 109, the messaging client 104 instructs the client device 102 to launch the external application 109 by executing locally-stored code corresponding to the external application 109. In response to determining that the external resource is a web-based resource, the messaging client 104 communicates with the external app(s) servers 110 to obtain a markup-language document corresponding to the selected resource. The messaging client 104 then processes the obtained markup-language document to present the web-based external resource within a user interface of the messaging client 104.

The messaging client 104 can notify a user of the client device 102, or other users related to such a user (e.g., "friends"), of activity taking place in one or more external resources. For example, the messaging client 104 can provide participants in a conversation (e.g., a chat session) in the messaging client 104 with notifications relating to the current or recent use of an external resource by one or more members of a group of users. One or more users can be invited to join in an active external resource or to launch a recently-used but currently inactive (in the group of friends) external resource. The external resource can provide participants in a conversation, each using a respective messaging client messaging clients 104, with the ability to share an item, status, state, or location in an external resource with one or more members of a group of users into a chat session. The shared item may be an interactive chat card with which members of the chat can interact, for example, to launch the corresponding external resource, view specific information within the external resource, or take the member of the chat to a specific location or state within the external resource. Within a given external resource, response messages can be sent to users on the messaging client 104. The external resource can selectively include different media items in the responses, based on a current context of the external resource.

The messaging client 104 can present a list of the available external resources (e.g., third-party or external applications 109 or applets) to a user to launch or access a given external resource. This list can be presented in a context-sensitive menu. For example, the icons representing different ones of the external application 109 (or applets) can vary based on how the menu is launched by the user (e.g., from a conversation interface or from a non-conversation interface).

System Architecture

FIG. 2 is a block diagram illustrating further details regarding the messaging system 100, according to some examples. Specifically, the messaging system 100 is shown to comprise the messaging client 104 and the application servers 114. The messaging system 100 embodies a number of subsystems, which are supported on the client side by the messaging client 104 and on the sever side by the application servers 114. These subsystems include, for example, an ephemeral timer system 202, a collection management system 204, an augmentation system 208, a map system 210, a game system 212, and an external resource system 220.

The ephemeral timer system 202 is responsible for enforcing the temporary or time-limited access to content by the messaging client 104 and the messaging server 118. The ephemeral timer system 202 incorporates a number of timers that, based on duration and display parameters associated with a message, or collection of messages (e.g., a story), selectively enable access (e.g., for presentation and display) to messages and associated content via the messaging client 104. Further details regarding the operation of the ephemeral timer system 202 are provided below.

The collection management system 204 is responsible for managing sets or collections of media (e.g., collections of text, image video, and audio data). A collection of content (e.g., messages, including images, video, text, and audio) may be organized into an "event gallery" or an "event story." Such a collection may be made available for a specified time period, such as the duration of an event to which the content relates. For example, content relating to a music concert may be made available as a "story" for the duration of that music concert. The collection management system 204 may also be responsible for publishing an icon that provides notification of the existence of a particular collection to the user interface of the messaging client 104.

The collection management system 204 furthermore includes a curation interface 206 that allows a collection manager to manage and curate a particular collection of content. For example, the curation interface 206 enables an event organizer to curate a collection of content relating to a specific event (e.g., delete inappropriate content or redundant messages). Additionally, the collection management system 204 employs machine vision (or image recognition technology) and content rules to automatically curate a content collection. In certain examples, compensation may be paid to a user for the inclusion of user-generated content into a collection. In such cases, the collection management system 204 operates to automatically make payments to such users for the use of their content.

The augmentation system 208 provides various functions that enable a user to augment (e.g., annotate or otherwise modify or edit) media content associated with a message. For example, the augmentation system 208 provides functions related to the generation and publishing of media overlays for messages processed by the messaging system 100. The augmentation system 208 operatively supplies a media overlay or augmentation (e.g., an image filter) to the messaging client 104 based on a geolocation of the client device 102. In another example, the augmentation system 208 operatively supplies a media overlay to the messaging client 104 based on other information, such as social network information of the user of the client device 102. A media overlay may include audio and visual content and visual effects. Examples of audio and visual content include pictures, texts, logos, animations, and sound effects. An example of a visual effect includes color overlaying. The audio and visual content or the visual effects can be applied to a media content item (e.g., a photo) at the client device 102. For example, the media overlay may include text, a graphical element, or image that can be overlaid on top of a photograph taken by the client device 102. In another example, the media overlay includes an identification of a location overlay (e.g., Venice beach), a name of a live event, or a name of a merchant overlay (e.g., Beach Coffee House). In another example, the augmentation system 208 uses the geolocation of the client device 102 to identify a media overlay that includes the name of a merchant at the geolocation of the client device 102. The media overlay may include other indicia associated with the merchant. The media overlays may be stored in the database 126 and accessed through the database server 120.

In some examples, the augmentation system 208 provides a user-based publication platform that enables users to select a geolocation on a map and upload content associated with the selected geolocation. The user may also specify circumstances under which a particular media overlay should be offered to other users. The augmentation system 208 generates a media overlay that includes the uploaded content and associates the uploaded content with the selected geolocation.

In other examples, the augmentation system 208 provides a merchant-based publication platform that enables merchants to select a particular media overlay associated with a geolocation via a bidding process. For example, the augmentation system 208 associates the media overlay of the highest bidding merchant with a corresponding geolocation for a predefined amount of time. The augmentation system 208 communicates with the image processing server 122 to automatically select and activate an augmented reality experience related to an image captured by the client device 102. Once the augmented reality experience is selected as the user scans images using a camera in the user's environment, one or more images, videos, or augmented reality graphical elements are retrieved and presented as an overlay on top of the scanned images. In some cases, the camera is switched to a front-facing view (e.g., the front-facing camera of the client device 102 is activated in response to activation of a particular augmented reality experience) and the images from the front-facing camera of the client device 102 start being displayed on the client device 102 instead of the rear-facing camera of the client device 102. The one or more images, videos, or augmented reality graphical elements are retrieved and presented as an overlay on top of the images that are captured and displayed by the front-facing camera of the client device 102.

The map system 210 provides various geographic location functions, and supports the presentation of map-based media content and messages by the messaging client 104. For example, the map system 210 enables the display of user icons or avatars (e.g., stored in profile data 316) on a map to indicate a current or past location of "friends" of a user, as well as media content (e.g., collections of messages including photographs and videos) generated by such friends, within the context of a map. For example, a message posted by a user to the messaging system 100 from a specific geographic location may be displayed within the context of a map at that particular location to "friends" of a specific user on a map interface of the messaging client 104. A user can furthermore share his or her location and status information (e.g., using an appropriate status avatar) with other users of the messaging system 100 via the messaging client 104, with this location and status information being similarly displayed within the context of a map interface of the messaging client 104 to selected users.

The game system 212 provides various gaming functions within the context of the messaging client 104. The messaging client 104 provides a game interface providing a list of available games (e.g., web-based games or web-based applications) that can be launched by a user within the context of the messaging client 104, and played with other users of the messaging system 100. The messaging system 100 further enables a particular user to invite other users to participate in the play of a specific game, by issuing invitations to such other users from the messaging client 104. The messaging client 104 also supports both voice and text messaging (e.g., chats) within the context of gameplay, provides a leaderboard for the games, and also supports the provision of in-game rewards (e.g., coins and items).

The external resource system 220 provides an interface for the messaging client 104 to communicate with external app(s) servers 110 to launch or access external resources. Each external resource (apps) server 110 hosts, for example, a markup language (e.g., HTML5) based application or small-scale version of an external application (e.g., game, utility, payment, or ride-sharing application that is external to the messaging client 104). The messaging client 104 may launch a web-based resource (e.g., application) by accessing the HTML5 file from the external resource (apps) servers 110 associated with the web-based resource. In certain examples, applications hosted by external resource servers 110 are programmed in JavaScript leveraging a Software Development Kit (SDK) provided by the messaging server 118. The SDK includes Application Programming Interfaces (APIs) with functions that can be called or invoked by the web-based application. In certain examples, the messaging server 118 includes a JavaScript library that provides a given third-party resource access to certain user data of the messaging client 104. HTML5 is used as an example technology for programming games, but applications and resources programmed based on other technologies can be used.

In order to integrate the functions of the SDK into the web-based resource, the SDK is downloaded by an external resource (apps) server 110 from the messaging server 118 or is otherwise received by the external resource (apps) server 110. Once downloaded or received, the SDK is included as part of the application code of a web-based external resource. The code of the web-based resource can then call or invoke certain functions of the SDK to integrate features of the messaging client 104 into the web-based resource.

The SDK stored on the messaging server 118 effectively provides the bridge between an external resource (e.g., third-party or external applications 109 or applets and the messaging client 104). This provides the user with a seamless experience of communicating with other users on the messaging client 104, while also preserving the look and feel of the messaging client 104. To bridge communications between an external resource and a messaging client 104, in certain examples, the SDK facilitates communication between external resource servers 110 and the messaging client 104. In certain examples, a WebViewJavaScriptBridge running on a client device 102 establishes two one-way communication channels between a external resource and the messaging client 104. Messages are sent between the external resource and the messaging client 104 via these communication channels asynchronously. Each SDK function invocation is sent as a message and callback. Each SDK function is implemented by constructing a unique callback identifier and sending a message with that callback identifier.

By using the SDK, not all information from the messaging client 104 is shared with external resource servers 110. The SDK limits which information is shared based on the needs of the external resource. In certain examples, each external resource server 110 provides an HTML5 file corresponding to the web-based external resource to the messaging server 118. The messaging server 118 can add a visual representation (such as a box art or other graphic) of the web-based external resource in the messaging client 104. Once the user selects the visual representation or instructs the messaging client 104 through a GUI of the messaging client 104 to access features of the web-based external resource, the messaging client 104 obtains the HTML5 file and instantiates the resources necessary to access the features of the web-based external resource.

The messaging client 104 presents a graphical user interface (e.g., a landing page or title screen) for an external resource. During, before, or after presenting the landing page or title screen, the messaging client 104 determines whether the launched external resource has been previously authorized to access user data of the messaging client 104. In response to determining that the launched external resource has been previously authorized to access user data of the messaging client 104, the messaging client 104 presents another graphical user interface of the external resource that includes functions and features of the external resource. In response to determining that the launched external resource has not been previously authorized to access user data of the messaging client 104, after a threshold period of time (e.g., 3 seconds) of displaying the landing page or title screen of the external resource, the messaging client 104 slides up (e.g., animates a menu as surfacing from a bottom of the screen to a middle of or other portion of the screen) a menu for authorizing the external resource to access the user data. The menu identifies the type of user data that the external resource will be authorized to use. In response to receiving a user selection of an accept option, the messaging client 104 adds the external resource to a list of authorized external resources and allows the external resource to access user data from the messaging client 104. In some examples, the external resource is authorized by the messaging client 104 to access the user data in accordance with an OAuth 2 framework.

The messaging client 104 controls the type of user data that is shared with external resources based on the type of external resource being authorized. For example, external resources that include full-scale external applications (e.g., a third-party or external application 109) are provided with access to a first type of user data (e.g., only two-dimensional avatars of users with or without different avatar characteristics). As another example, external resources that include small-scale versions of external applications (e.g., web-based versions of third-party applications) are provided with access to a second type of user data (e.g., payment information, two-dimensional avatars of users, three-dimensional avatars of users, and avatars with various avatar characteristics). Avatar characteristics include different ways to customize a look and feel of an avatar, such as different poses, facial features, clothing, and so forth.

The pose generation system 230 generates and implements the CHAIN model to synthesize the pose of a person with clothes of another and/or to synthesize the pose of a person in an input image in a different pose depicted in a target image.

Data Architecture

FIG. 3 is a schematic diagram illustrating data structures 300, which may be stored in the database 126 of the messaging server system 108, according to certain examples. While the content of the database 126 is shown to comprise a number of tables, it will be appreciated that the data could be stored in other types of data structures (e.g., as an object-oriented database).

The database 126 includes message data stored within a message table 302. This message data includes, for any particular one message, at least message sender data, message recipient (or receiver) data, and a payload. Further details regarding information that may be included in a message, and included within the message data stored in the message table 302, is described below with reference to FIG. 4.

An entity table 306 stores entity data, and is linked (e.g., referentially) to an entity graph 308 and profile data 316. Entities for which records are maintained within the entity table 306 may include individuals, corporate entities, organizations, objects, places, events, and so forth. Regardless of entity type, any entity regarding which the messaging server system 108 stores data may be a recognized entity. Each entity is provided with a unique identifier, as well as an entity type identifier (not shown).

The entity graph 308 stores information regarding relationships and associations between entities. Such relationships may be social, professional (e.g., work at a common corporation or organization) interested-based or activity-based, merely for example.

The profile data 316 stores multiple types of profile data about a particular entity. The profile data 316 may be selectively used and presented to other users of the messaging system 100, based on privacy settings specified by a particular entity. Where the entity is an individual, the profile data 316 includes, for example, a user name, telephone number, address, settings (e.g., notification and privacy settings), as well as a user-selected avatar representation (or collection of such avatar representations). A particular user may then selectively include one or more of these avatar representations within the content of messages communicated via the messaging system 100, and on map interfaces displayed by messaging clients 104 to other users. The collection of avatar representations may include "status avatars," which present a graphical representation of a status or activity that the user may select to communicate at a particular time.

Where the entity is a group, the profile data 316 for the group may similarly include one or more avatar representations associated with the group, in addition to the group name, members, and various settings (e.g., notifications) for the relevant group.

The database 126 also stores augmentation data, such as overlays or filters, in an augmentation table 310. The augmentation data is associated with and applied to videos (for which data is stored in a video table 304) and images (for which data is stored in an image table 312).

Filters, in one example, are overlays that are displayed as overlaid on an image or video during presentation to a recipient user. Filters may be of various types, including user-selected filters from a set of filters presented to a sending user by the messaging client 104 when the sending user is composing a message. Other types of filters include geolocation filters (also known as geo-filters), which may be presented to a sending user based on geographic location. For example, geolocation filters specific to a neighborhood or special location may be presented within a user interface by the messaging client 104, based on geolocation information determined by a Global Positioning System (GPS) unit of the client device 102.

Another type of filter is a data filter, which may be selectively presented to a sending user by the messaging client 104, based on other inputs or information gathered by the client device 102 during the message creation process. Examples of data filters include current temperature at a specific location, a current speed at which a sending user is traveling, battery life for a client device 102, or the current time.

Other augmentation data that may be stored within the image table 312 includes augmented reality content items (e.g., corresponding to applying lenses or augmented reality experiences). An augmented reality content item may be a real-time special effect and sound that may be added to an image or a video. Each augmented reality experience may be associated with one or more marker images. In some examples, when a marker image is determined to match a query image received from the client device 102, the corresponding augmented reality experience (e.g., the augmentation data) of the maker image is retrieved from the image table 312 and provided to the client device 102.

As described above, augmentation data includes augmented reality content items, overlays, image transformations, AR images, and similar terms that refer to modifications that may be applied to image data (e.g., videos or images). This includes real-time modifications, which modify an image as it is captured using device sensors (e.g., one or multiple cameras) of a client device 102 and then displayed on a screen of the client device 102 with the modifications. This also includes modifications to stored content, such as video clips in a gallery that may be modified. For example, in a client device 102 with access to multiple augmented reality content items, a user can use a single video clip with multiple augmented reality content items to see how the different augmented reality content items will modify the stored clip. For example, multiple augmented reality content items that apply different pseudorandom movement models can be applied to the same content by selecting different augmented reality content items for the content. Similarly, real-time video capture may be used with an illustrated modification to show how video images currently being captured by sensors of a client device 102 would modify the captured data. Such data may simply be displayed on the screen and not stored in memory, or the content captured by the device sensors may be recorded and stored in memory with or without the modifications (or both). In some systems, a preview feature can show how different augmented reality content items will look within different windows in a display at the same time. This can, for example, enable multiple windows with different pseudo-random animations to be viewed on a display at the same time.

Data and various systems using augmented reality content items or other such transform systems to modify content using this data can thus involve detection of objects (e.g., faces, hands, bodies, cats, dogs, surfaces, objects, etc.), tracking of such objects as they leave, enter, and move around the field of view in video frames, and the modification or transformation of such objects as they are tracked. In various examples, different methods for achieving such transformations may be used. Some examples may involve generating a three-dimensional mesh model of the object or objects, and using transformations and animated textures of the model within the video to achieve the transformation. In other examples, tracking of points on an object may be used to place an image or texture (which may be two dimensional or three dimensional) at the tracked position. In still further examples, neural network analysis of video frames may be used to place images, models, or textures in content (e.g., images or frames of video). Augmented reality content items thus refer both to the images, models, and textures used to create transformations in content, as well as to additional modeling and analysis information needed to achieve such transformations with object detection, tracking, and placement.

Real-time video processing can be performed with any kind of video data (e.g., video streams, video files, etc.) saved in a memory of a computerized system of any kind. For example, a user can load video files and save them in a memory of a device, or can generate a video stream using sensors of the device. Additionally, any objects can be processed using a computer animation model, such as a human's face and parts of a human body, animals, or non-living things such as chairs, cars, or other objects.

In some examples, when a particular modification is selected along with content to be transformed, elements to be transformed are identified by the computing device, and then detected and tracked if they are present in the frames of the video. The elements of the object are modified according to the request for modification, thus transforming the frames of the video stream. Transformation of frames of a video stream can be performed by different methods for different kinds of transformation. For example, for transformations of frames mostly referring to changing forms of object's elements, characteristic points for each element of an object are calculated (e.g., using an Active Shape Model (ASM) or other known methods). Then, a mesh based on the characteristic points is generated for each of the at least one element of the object. This mesh is used in the following stage of tracking the elements of the object in the video stream. In the process of tracking, the mentioned mesh for each element is aligned with a position of each element. Then, additional points are generated on the mesh. A first set of first points is generated for each element based on a request for modification, and a set of second points is generated for each element based on the set of first points and the request for modification. Then, the frames of the video stream can be transformed by modifying the elements of the object on the basis of the sets of first and second points and the mesh. In such method, a background of the modified object can be changed or distorted as well by tracking and modifying the background.

In some examples, transformations changing some areas of an object using its elements can be performed by calculating characteristic points for each element of an object and generating a mesh based on the calculated characteristic points. Points are generated on the mesh, and then various areas based on the points are generated. The elements of the object are then tracked by aligning the area for each element with a position for each of the at least one element, and properties of the areas can be modified based on the request for modification, thus transforming the frames of the video stream. Depending on the specific request for modification, properties of the mentioned areas can be transformed in different ways. Such modifications may involve changing color of areas; removing at least some part of areas from the frames of the video stream; including one or more new objects into areas which are based on a request for modification; and modifying or distorting the elements of an area or object. In various examples, any combination of such modifications or other similar modifications may be used. For certain models to be animated, some characteristic points can be selected as control points to be used in determining the entire state-space of options for the model animation.

In some examples of a computer animation model to transform image data using face detection, the face is detected on an image with use of a specific face detection algorithm (e.g., Viola-Jones). Then, an Active Shape Model (ASM) algorithm is applied to the face region of an image to detect facial feature reference points.

Other methods and algorithms suitable for face detection can be used. For example, in some examples, features are located using a landmark, which represents a distinguishable point present in most of the images under consideration. For facial landmarks, for example, the location of the left eye pupil may be used. If an initial landmark is not identifiable (e.g., if a person has an eyepatch), secondary landmarks may be used. Such landmark identification procedures may be used for any such objects. In some examples, a set of landmarks forms a shape. Shapes can be represented as vectors using the coordinates of the points in the shape. One shape is aligned to another with a similarity transform (allowing translation, scaling, and rotation) that minimizes the average Euclidean distance between shape points. The mean shape is the mean of the aligned training shapes.

In some examples, a search for landmarks from the mean shape aligned to the position and size of the face determined by a global face detector is started. Such a search then repeats the steps of suggesting a tentative shape by adjusting the locations of shape points by template matching of the image texture around each point and then conforming the tentative shape to a global shape model until convergence occurs. In some systems, individual template matches are unreliable, and the shape model pools the results of the weak template matches to form a stronger overall classifier. The entire search is repeated at each level in an image pyramid, from coarse to fine resolution.

A transformation system can capture an image or video stream on a client device (e.g., the client device 102) and perform complex image manipulations locally on the client device 102 while maintaining a suitable user experience, computation time, and power consumption. The complex image manipulations may include size and shape changes, emotion transfers (e.g., changing a face from a frown to a smile), state transfers (e.g., aging a subject, reducing apparent age, changing gender), style transfers, graphical element application, and any other suitable image or video manipulation implemented by a convolutional neural network that has been configured to execute efficiently on the client device 102.

In some examples, a computer animation model to transform image data can be used by a system where a user may capture an image or video stream of the user (e.g., a selfie) using a client device 102 having a neural network operating as part of a messaging client 104 operating on the client device 102. The transformation system operating within the messaging client 104 determines the presence of a face within the image or video stream and provides modification icons associated with a computer animation model to transform image data, or the computer animation model can be present as associated with an interface described herein. The modification icons include changes that may be the basis for modifying the user's face within the image or video stream as part of the modification operation. Once a modification icon is selected, the transformation system initiates a process to convert the image of the user to reflect the selected modification icon (e.g., generate a smiling face on the user). A modified image or video stream may be presented in a graphical user interface displayed on the client device 102 as soon as the image or video stream is captured, and a specified modification is selected. The transformation system may implement a complex convolutional neural network on a portion of the image or video stream to generate and apply the selected modification. That is, the user may capture the image or video stream and be presented with a modified result in real-time or near real-time once a modification icon has been selected. Further, the modification may be persistent while the video stream is being captured, and the selected modification icon remains toggled. Machine-taught neural networks may be used to enable such modifications.

The graphical user interface, presenting the modification performed by the transformation system, may supply the user with additional interaction options. Such options may be based on the interface used to initiate the content capture and selection of a particular computer animation model (e.g., initiation from a content creator user interface). In various examples, a modification may be persistent after an initial selection of a modification icon. The user may toggle the modification on or off by tapping or otherwise selecting the face being modified by the transformation system and store it for later viewing or browse to other areas of the imaging application. Where multiple faces are modified by the transformation system, the user may toggle the modification on or off globally by tapping or selecting a single face modified and displayed within a graphical user interface. In some examples, individual faces, among a group of multiple faces, may be individually modified, or such modifications may be individually toggled by tapping or selecting the individual face or a series of individual faces displayed within the graphical user interface.

A story table 314 stores data regarding collections of messages and associated image, video, or audio data, which are compiled into a collection (e.g., a story or a gallery). The creation of a particular collection may be initiated by a particular user (e.g., each user for which a record is maintained in the entity table 306). A user may create a "personal story" in the form of a collection of content that has been created and sent/broadcast by that user. To this end, the user interface of the messaging client 104 may include an icon that is user-selectable to enable a sending user to add specific content to his or her personal story.

A collection may also constitute a "live story," which is a collection of content from multiple users that is created manually, automatically, or using a combination of manual and automatic techniques. For example, a "live story" may constitute a curated stream of user-submitted content from various locations and events. Users whose client devices have location services enabled and are at a common location event at a particular time may, for example, be presented with an option, via a user interface of the messaging client 104, to contribute content to a particular live story. The live story may be identified to the user by the messaging client 104, based on his or her location. The end result is a "live story" told from a community perspective.

A further type of content collection is known as a "location story," which enables a user whose client device 102 is located within a specific geographic location (e.g., on a college or university campus) to contribute to a particular collection. In some examples, a contribution to a location story may require a second degree of authentication to verify that the end user belongs to a specific organization or other entity (e.g., is a student on the university campus).

As mentioned above, the video table 304 stores video data that, in one example, is associated with messages for which records are maintained within the message table 302. Similarly, the image table 312 stores image data associated with messages for which message data is stored in the entity table 306. The entity table 306 may associate various augmentations from the augmentation table 310 with various images and videos stored in the image table 312 and the video table 304.

Data Communications Architecture

Figure 4:
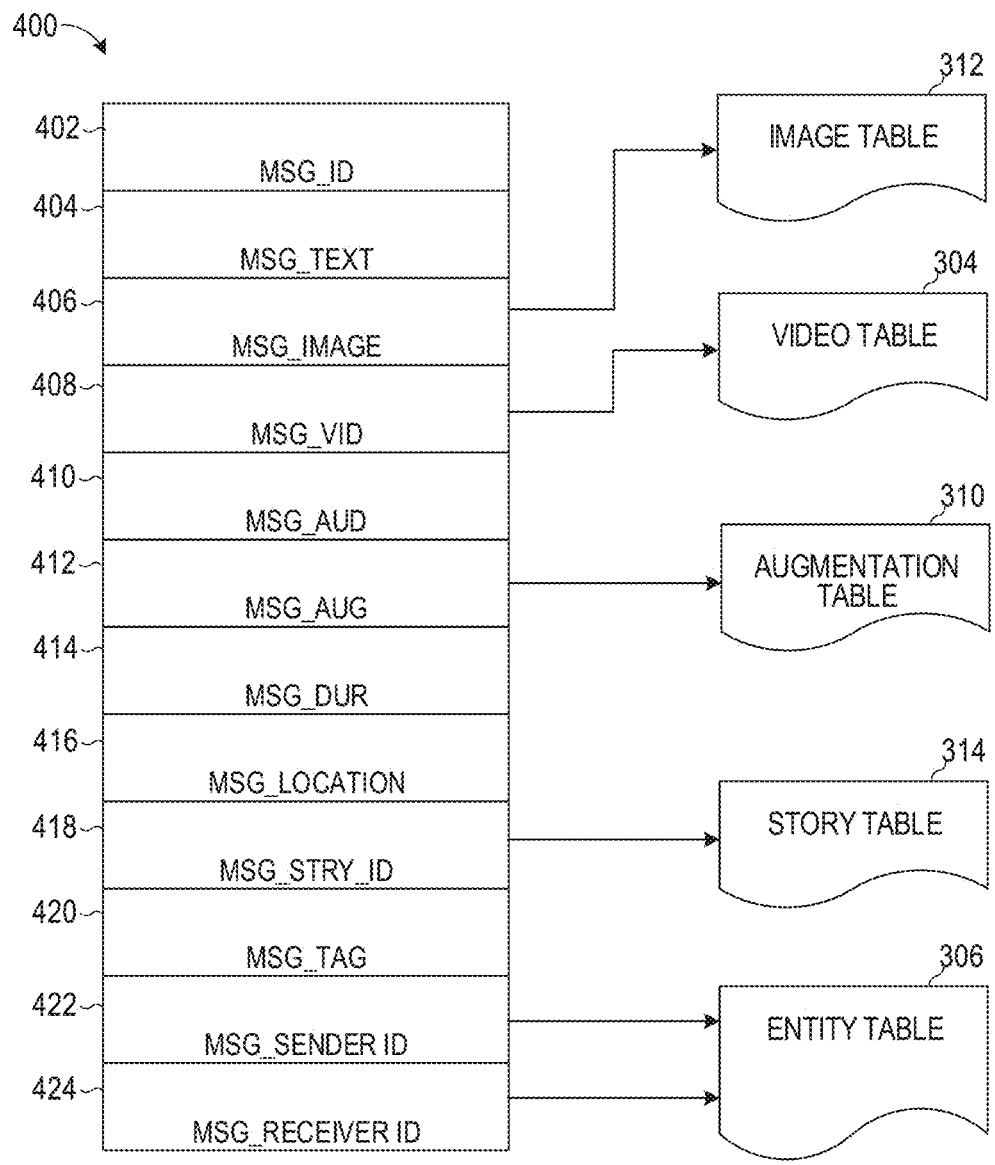
FIG. 4 is a diagrammatic representation of a message, in accordance with some examples.

FIG. 4 is a schematic diagram illustrating a structure of a message 400, according to some examples, generated by a messaging client 104 for communication to a further messaging client 104 or the messaging server 118. The content of a particular message 400 is used to populate the message table 302 stored within the database 126, accessible by the messaging server 118. Similarly, the content of a message 400 is stored in memory as "in-transit" or "in-flight" data of the client device 102 or the application servers 114. A message 400 is shown to include the following example components:
- message identifier 402: a unique identifier that identifies the message 400.
- message text payload 404: text, to be generated by a user via a user interface of the client device 102, and that is included in the message 400.
- message image payload 406: image data, captured by a camera component of a client device 102 or retrieved from a memory component of a client device 102, and that is included in the message 400. Image data for a sent or received message 400 may be stored in the image table 312.
- message video payload 408: video data, captured by a camera component or retrieved from a memory component of the client device 102, and that is included in the message 400. Video data for a sent or received message 400 may be stored in the video table 304.
- message audio payload 410: audio data, captured by a microphone or retrieved from a memory component of the client device 102, and that is included in the message 400.
- message augmentation data 412: augmentation data (e.g., filters, stickers, or other annotations or enhancements) that represents augmentations to be applied to message image payload 406, message video payload 408, or message audio payload 410 of the message 400. Augmentation data for a sent or received message 400 may be stored in the augmentation table 310.
- message duration parameter 414: parameter value indicating, in seconds, the amount of time for which content of the message (e.g., the message image payload 406, message video payload 408, message audio payload 410) is to be presented or made accessible to a user via the messaging client 104.
- message geolocation parameter 416: geolocation data (e.g., latitudinal and longitudinal coordinates) associated with the content payload of the message. Multiple message geolocation parameter 416 values may be included in the payload, each of these parameter values being associated with respect to content items included in the content (e.g., a specific image within the message image payload 406, or a specific video in the message video payload 408).
- message story identifier 418: identifier values identifying one or more content collections (e.g., "stories" identified in the story table 314) with which a particular content item in the message image payload 406 of the message 400 is associated. For example, multiple images within the message image payload 406 may each be associated with multiple content collections using identifier values.
- message tag 420: each message 400 may be tagged with multiple tags, each of which is indicative of the subject matter of content included in the message payload. For example, where a particular image included in the message image payload 406 depicts an animal (e.g., a lion), a tag value may be included within the message tag 420 that is indicative of the relevant animal. Tag values may be generated manually, based on user input, or may be automatically generated using, for example, image recognition.

message sender identifier 422: an identifier (e.g., a messaging system identifier, email address, or device identifier) indicative of a user of the client device 102 on which the message 400 was generated and from which the message 400 was sent.

message receiver identifier 424: an identifier (e.g., a messaging system identifier, email address, or device identifier) indicative of a user of the client device 102 to which the message 400 is addressed.

The contents (e.g., values) of the various components of message 400 may be pointers to locations in tables within which content data values are stored. For example, an image value in the message image payload 406 may be a pointer to (or address of) a location within an image table 312. Similarly, values within the message video payload 408 may point to data stored within a video table 304, values stored within the message augmentation data 412 may point to data stored in an augmentation table 310, values stored within the message story identifier 418 may point to data stored in a story table 314, and values stored within the message sender identifier 422 and the message receiver identifier 424 may point to user records stored within an entity table 306.

Figure 5:
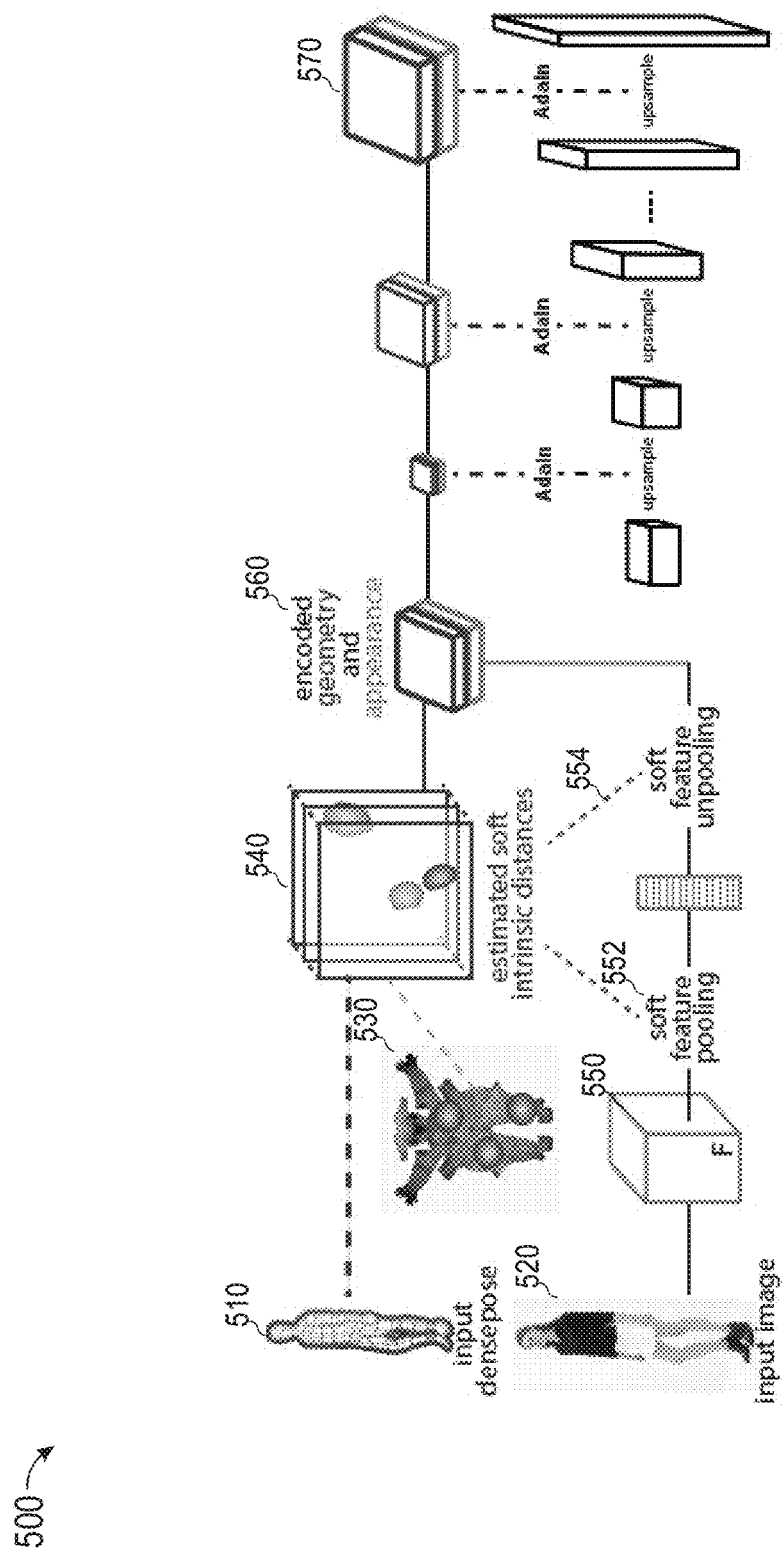
FIGS. 5 and 6 are diagrammatic representations of the operations performed by a pose generation system, in accordance with some examples.

FIG. 5 is a diagrammatic representation of the operations 500 performed by a pose generation system 230, in accordance with some examples. Specifically, the operations 500 represent a manner of training the CHAIN implementation of the pose generation system 230. To train the pose generation system 230, an input image 520 is received which may be a 2D image of a person in a given pose. A target image 510 may include the same or similar image as the input image 520. A feature extractor 550 is applied to the input image 520 to generate a set of soft feature pooling 552. The soft feature pooling 552 may be a matrix of the collection of features extracted from the input image 520 that are arranged based on expected locations of different joints.

As an example, a first row of the matrix may include a set of features that correspond to the shoulder joints. Features that are close to the expected location of the shoulder joint are assigned greater weights than those further away from the shoulder joint. A surface coordinate representation 530 of the different landmarks or joints is received and used to obtain the features or pixel values of the input image 520 and to assign the features or pixel values on the landmark or joint basis. The surface coordinate representation 530 can be received as a two-dimensional continuous surface representation of a three-dimensional object and comprises a plurality of landmark locations. As an example, an ellipse like area on the top right side of the estimated soft intrinsic distances representation 540 corresponds to the top right joint in the surface coordinates representation 530 and the shoulder part of the input image 520 in the image coordinates representation. A weighted average of the pixel values in that particular area is computed and assigned to one or more rows of the matrix to generate the soft feature pooling 552. So rather than looking at a particular position and assigning that position as the joint, the system computes an average of a whole area.

The pose generation system 230 uses dense pose analysis to localize areas in the human body. In those areas, the pose generation system 230 averages the features separately per area and this average is used as the appearance encoding of the image 520. Each tile in the estimated soft intrinsic distances 540 (first set of soft membership functions) represents a likelihood that the pixel values or features of the input image 520 correspond to a particular joint based on the surface coordinates representation 530. In some cases, the features of each joint or matrix row are unpooled by replicating an average of the features across the entire image domain to generate soft feature unpooling 554. This creates a dense feature representation of the extracted features using a second set of soft membership functions. The average is guided by an amplitude that is determined by the map of the estimated soft intrinsic distances 540. Effectively a given feature is copy and pasted everywhere but is scaled down in areas further away from the joint. Namely, for appearance conditioning pose generation system 230 uses the same P' soft membership functions to gather the image information into a compact, controllable appearance code, which is then broadcast back into the original image coordinates, and concatenated to the soft membership functions.

In one example, given an RGB image the pose generation system 230 obtains its UV charting using DensePose and softly assigns every object pixel to the control points based on the Euclidean distance between their respective UV values (e.g., encoded features are generated that represent extracted features using the first set of soft membership functions). A channel for background pixels is introduced, obtaining a tensor of P'=P+1 soft membership functions, or regions, that roughly positions every pixel on the human body. This information allows CHAIN to modulate the network's behavior in different ways based on the particular body area corresponding to pixel i.

In some examples, for the gathering stage the pose generation system 230 processes the RGB image with a fully convolutional encoder that produces at its topmost layer K=32 feature values for each of the P' membership functions, having K×P' channels in total. Each of these channels encodes different region-specific appearance information, e.g. hair color and style around faces, or shoe type around the feet. This information is compressed per region by performing a membership-weighted estimate of mean and variance per channel:

$$m_p^k = E_p[C^{k,p}], s_p^k = E_p[(C^{k,p} - m_p^k)^2],$$

k=1, ..., K, p=1, ... P, where i ranges over neuron positions, $$E_p[x] = \frac{1}{\pi_i^p} \Sigma_i \, \pi_i^p x_i$$

indicates expectation with respect to the soft membership function $\pi_i^p$ of region p, and $C^{k,p}$ is the response for the k-th channel of region p. Both feature mean and variance are encoded since these are commonly used to describe texture properties.

Gathering this information provides a concise, D=2K×P'-dimensional code of appearance in terms of feature statistics in the vicinity of a sparse set of control points. These can be interchanged, or faded between the regions of different persons, allowing for controllable image synthesis, e.g. by gradually interpolating between different identities or clothes. This sparse representation is broadcast into a densely-defined signal by relying again on the soft membership functions. In particular, the sparse code is spread over the area that it is most responsible for:

$$M_i^{k,p} = \sum_{p=1}^{P} \pi_i^p m_p^k, \ S_i^{k,p} = \sum_{p=1}^{P} \pi_i^p s_p^k$$

Note that $\pi^p$ functions are defined over the whole image domain, which effectively 'smears' the k-th channel of the p-th region over the part of the image that it occupies, while smoothly blending it with those of the neighboring regions. These operations provide the appearance conditioning signal, and can be understood as implementing a surface-driven image encoding, such as the encoded geometry and appearance 560.

The estimated soft intrinsic distances 540 are concatenated with the soft feature unpooled features 554 to provide an encoded geometry and appearance representation 560. The encoded geometry and appearance representation 560 is applied to an Adain network 570 to generate an output image.

In an example, the feature extractor 550 is implemented as a neural network (e.g., a convolutional neural network) to generate the soft feature pooling 552. The feature extractor 550 may be trained on a set of training images. For example, a first training image may be received and processed by the feature extractor 550. The feature extractor 550 generates the soft feature pooling 552 using a surface coordinate representation 530. The soft feature pooling 552 are processed to generate the soft feature unpooling 554. The same first training image is also processed as a target image to obtain the estimated soft intrinsic distances 540. The encoded geometry and appearance 560 is generated and used by the Adain network 570 to generate an output image. The output image is compared with the first training image to compute a loss. Based on a deviation between the two images and the loss, parameters of the feature extractor 550 are updated and used to process a second training image. Once the loss is within a threshold or a stopping criterion is met, the training ends. Namely, during training the same image is used to perform the pooling and unpooling of the features.

Figure 6:
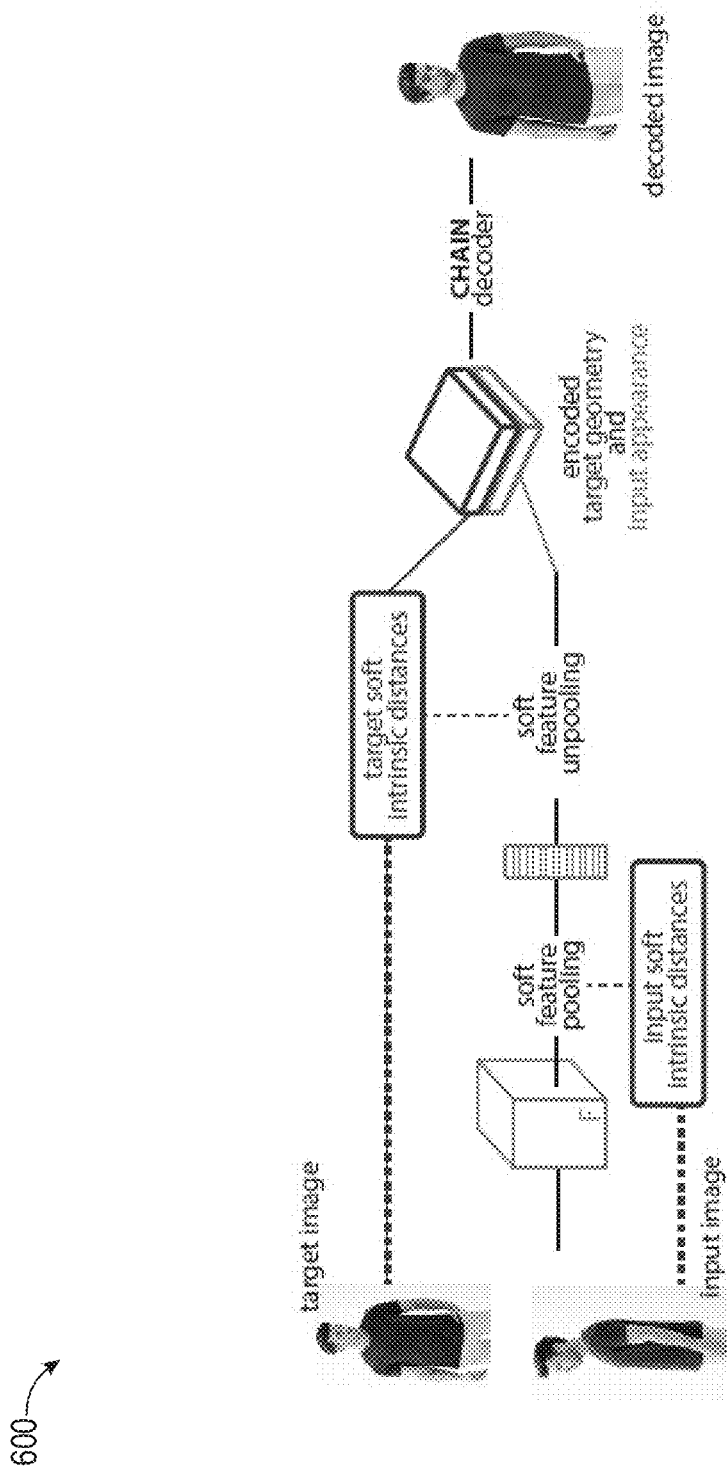

FIG. 6 is a diagrammatic representation of the operations 600 performed by a pose generation system 230, in accordance with some examples. The operations 600 are performed after the feature extractor 550 is trained. Namely, rather than the same image being input to as the input image and the target image, a first image depicting a person in a given pose is received as the input image. A target image is received that depicts the same person or a different person in another pose. The trained feature extractor 550 processes the input image to obtain soft feature pooling. The target image is processed to generate target soft intrinsic distances. The target soft intrinsic distances are concatenated with the unpooled features of the input image to provide the encoded target geometry and input appearance. This information is processed by a decoder, such as the Adain network 570 to generate a decoded output image.

Namely, the encoder uses two signals to drive the output. As shown in FIG. 6, the input image is processed to encode the appearance of the input image. For the pooling the source image is used and for the unpooling the target image is used. For example, the pose generation system 230 obtains the weighted average of the features in a given area. The pose generation system 230 then takes the average vector and places the features of the area on the target image. Namely, the features of the input image are smeared according to the features of the target image.

In some cases, the feature extractor 550 is further trained based on paired images depicting persons in different poses. For example, a first training image depicting a person in a first pose is received as the input image. A second training image depicting the person in a second pose is received as the target image. That first training image is processed by the feature extractor 550 to generate the soft feature pooling which are then unpooled using the features of the second training image. The unpooled features are concatenated with the target soft intrinsic distances and processed by the decoder to generate an output image. A loss is computed between the generated output image and the second training image and this loss is used to update parameters of the feature extractor 550 and/or the Adain network 570.

Figure 7:
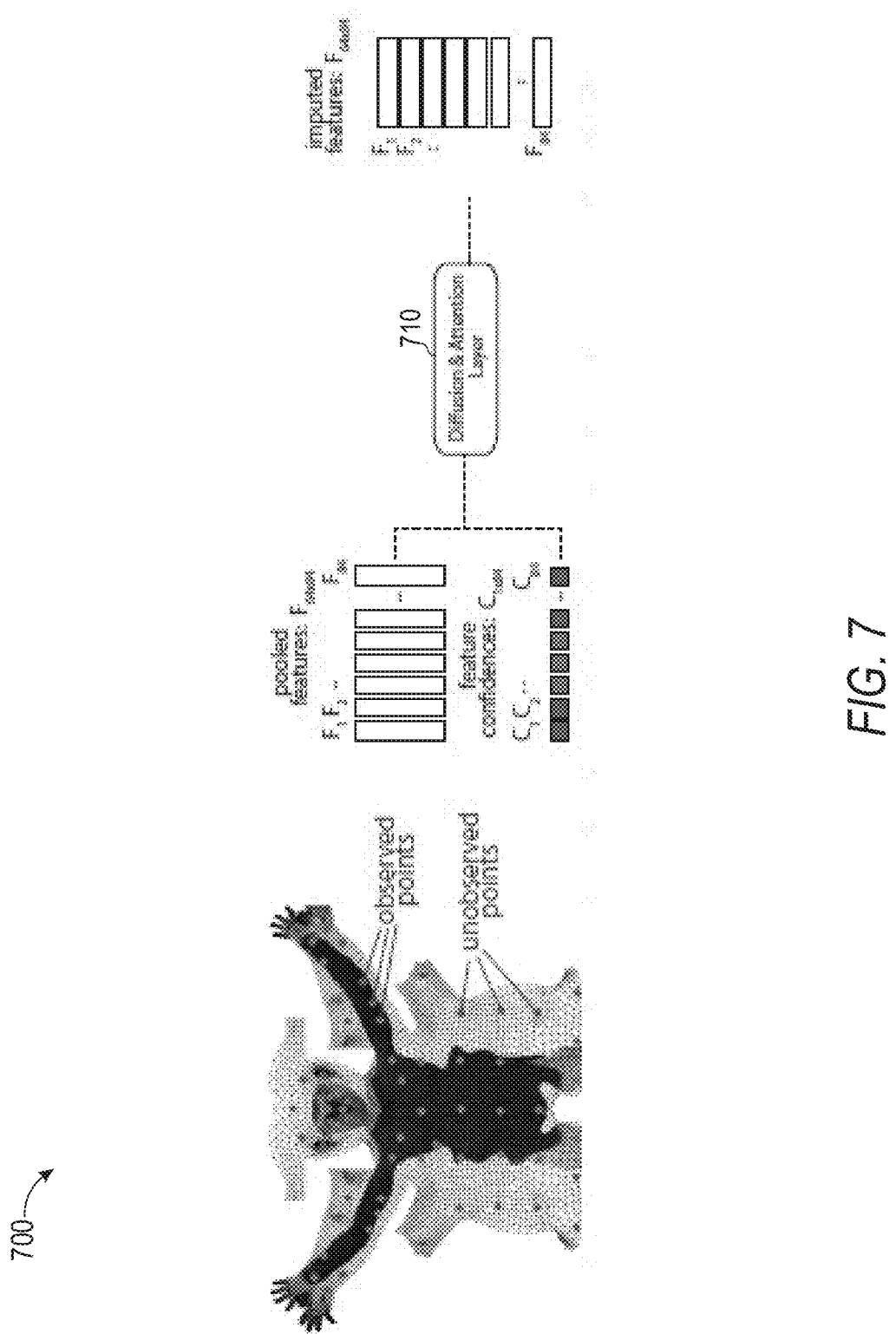
FIG. 7 is a diagrammatic representation of the diffusion and attention layer, in accordance with some examples.

In some cases, not all parts of the target image are observed in the input image. For example, in one image the pose generation system 230 observes only the side of the person and in another the pose generation system 230 observes only the front of the person. In such cases, a UV value of every pixel in the input image is mapped to distinguish those pixels that are observed from those that are not observed. A diffusion and attention layer 710, shown in FIG. 7, is a trained network, that may be included as part of the feature extractor 550, that diffuses visible information to the invisible area in cases where features from an unobserved area is used by the feature extractor 550 and/or the Adain network 570.

The objective of this task is to use separate appearance and a pose donors and synthesize a person that has the appearance of the former and the pose of the latter donor. The Diffusion-and-Attention layer or network 710 imputes the missing feature values for non-observed parts and then combines them with observed ones. In particular the encoded features are updated through a residual branch modulated by an attention signal that allows the pose generation system 230 to make stronger changes to unobserved features and leave fully observed features unchanged:

Diffuse: $F_D = W F_O$

Attend: $F' = A F_D + (1-A) F_O$ $A_p = \sigma(\langle w_p, C \rangle)$, where W, $w_p$ are parameters that are learned end-to-end, $F_O$ indicates the observed encodings, $F_D$ is the result of diffusing the information across the control points, A is an attention signal that indicates whether the encoding should be updated or retained, and C is a P-dimensional vector obtained from the normalized-across-regions area of the membership functions, $$C_p = \frac{\Sigma_i \pi_i^p}{\Sigma_p \Sigma_i \pi_i^p}.$$

Through $w_p$ each region p can learn its own attention function, allowing e.g. a smaller head region to have a lower threshold for considering that it is occluded than a larger torso region. The Diffusion-and-Attention layer or network 710 is also trained based on paired training images to learn and update the diffuse and attend parameters (e.g., W, $w_p$) based on back propagation. The attention signal A measures whether a pixel was observed or not. The attention signal controls whether a diffused feature or the observed feature should be used. When a feature is visible, that feature or the expected feature is used in the feature extractor 550 and when the feature is not visible the diffused feature is used instead. In some cases, the soft feature pooling labels the features as diffused features or visible features that are then used in the soft feature unpooling operations.

Figure 8:
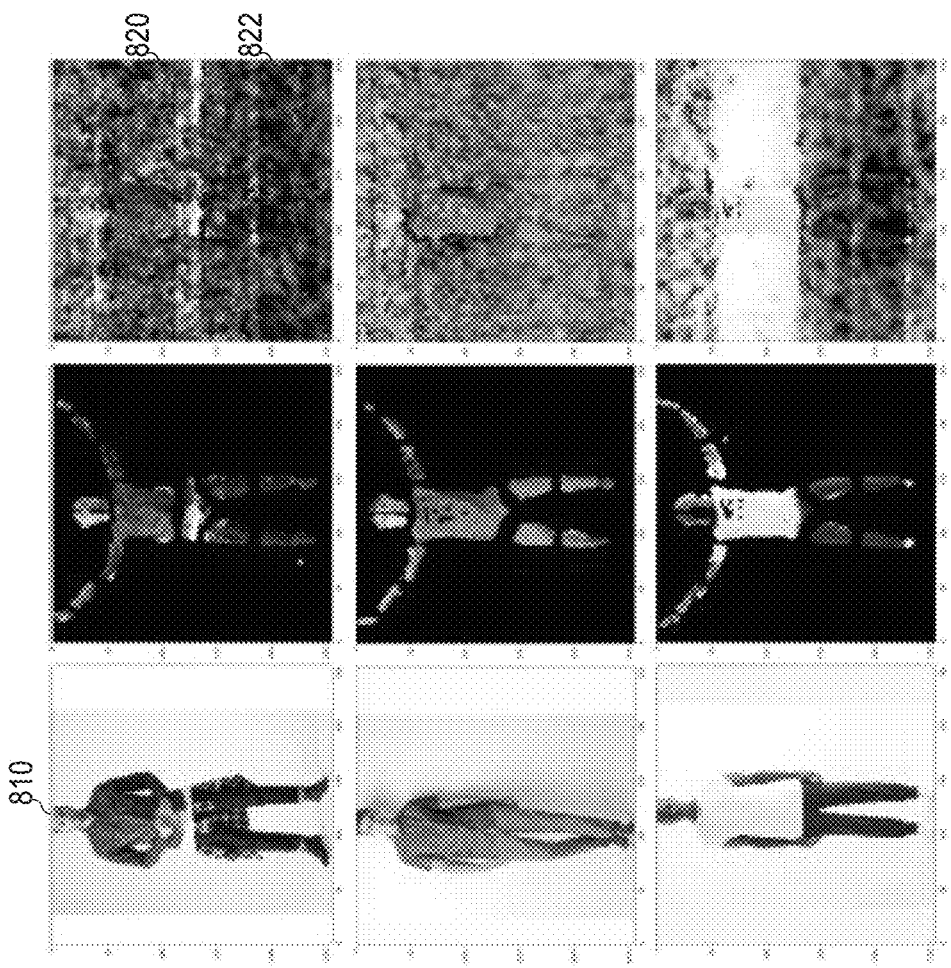
FIG. 8 is a diagrammatic representation of the position and feature statistics modeling, in accordance with some examples.

FIG. 8 is a diagrammatic representation 800 of the position and feature statistics modeling, in accordance with some examples. In some cases, the feature extractor 550 further implements the position and feature statistics modeling.

The position and feature statistics modeling collects first and second-order moments of a filterbank for a reference dataset (or a single image), and then synthesizes a new signal that reproduces the same statistics. Based on whether the new signal is randomly initialized, or bound to stay close to some content signal texture synthesis or style transfer is provided, respectively. Instead of influencing the decoder network based on the style signal, the statistics of the network features are adapted so that their gram matrices match. This operation is complemented with a decoder that learns a mapping from arbitrary network features to the input image. As such, any feature-level operation has a direct image counterpart that can be efficiently computed.

The disclosed system introduces charting information in efficient, feed-forward systems for style transfer that relies on Gaussian density modeling, and subsequent matching ('coloring') of feature statistics. This allows the feature extractor 550 to condition synthesis on continuous coordinates, and facilitates texture modeling and inpainting that respects surface positions.

The whitening and color transform may be implemented by the feature extractor 550 to match the statistics of VGG network features of a content image to a style image. In particular, denoting by $\bar{f}^c$, $\Sigma_{ff}^c$, the empirical feature mean and covariance of the content signal c and $\bar{f}^s$, $\Sigma_{ff}^s$ for the style signal respectively, the goal is match the content features statistics to those of the target signal. For this, the feature extractor 550 first centers and rotates the content features with a whitening transform:

$$\hat{f}^c = W^c(f^c - \bar{f}^c), \; W^c = E_c D_c^{-\frac{1}{2}} E_c^T,$$

where $E_c$, $D_c$ are formed from the eigenvectors and eigenvalues of $\Sigma_{ff}^c = E_c D_c E_c^T$. In the second step the feature extractor 550 transforms the features again with a coloring transform:

$$\hat{f}^s = W^s(\hat{f}^c + \bar{f}^s), \; W^s = E_s D_s^{\frac{1}{2}} E_s^T,$$

where now $\Sigma_{ff}^s = E_s D_s E_s^T$. One can easily verify that $\hat{f}^c$ have zero mean and identity covariance, while $\hat{f}^s$ have the mean $\bar{f}^s$ and covariance $\Sigma_{ff}^s$ of the style signal. This process is efficient, since it only requires two matrix diagonalizations, rather than gradient descent. By accounting for the dependence of the texture statistics on position, the feature extractor 550 can handle non-stationarity of stylization.

A multivariate Gaussian model is employed to capture the dependence of the feature activation vector f on continuous position coordinates x. These can be pixel positions or in our case, the chart coordinates associated to a given observation. Specifically, the feature extractor 550 considers:

$$(f, x) \sim N\left((\bar{f}, \bar{x}), \begin{bmatrix} \Sigma_{ff} & \Sigma_{fx} \\ \Sigma_{xf} & \Sigma_{xx} \end{bmatrix}\right)$$

The Gaussian mean and covariance matrices of the source and style image are estimated by accumulating the local second order statistics within respective regions. Using this factorization, the spatially-dependent feature activations can be modeled through the conditional distribution $f|x \sim N(\bar{f}(x), \Sigma_{f|x})$, with $$\bar{f}(x) = \bar{f} + \Sigma_{fx} \Sigma_{xx}^{-1} (x - \bar{x})$$

$$\Sigma_{f|x} = \Sigma_{ff} - \Sigma_{fx} \Sigma_{xx}^{-1} \Sigma_{xf}$$

The position-corrected counterparts of the whitening and coloring transforms can be obtained as follows:

$$\hat{f}^c = W^c(f^c - \bar{f}^c(x)), \; W^c = E_c D_c^{-\frac{1}{2}} E_c^T,$$

$$\hat{f}^s = W^s(\hat{f}^c + \bar{f}^s(x)), \; W^s = E_s D_s^{\frac{1}{2}} E_s^T,$$

where $E_s D_s E_s^T = \Sigma_{f|x}^s$ and $E_c D_c E_c^T = \Sigma_{f|x}^c$ use the conditional feature covariance matrices and the centering transform depends on the particular feature position x.

In some cases, the 2-D chart coordinates x are mapped through a learnable embedding $x' = \phi(x)$ implemented through a two-layer MLP with 256 hidden units and 16 output vectors. The feature extractor 550 uses joint feature-texture model when modeling appearance in intrinsic, UV coordinates. There is mirror symmetry around the center vertical axis (capturing the left/right symmetry of appearance) while features should be more correlated in the horizontal rather than the vertical direction (since texture changes more drastically going from trousers/skirts to blouses/shirts). Based on these observations embedding networks minimize the following objective:

$$C(\phi) = E_{x_1, x_2}[|\langle \phi(x_1), \phi(x_2) \rangle - K(x_1, x_2)\rangle|^2]$$

where $K((u_1, v_1), (u_2, v_2))) =$ $$\exp\left(-\alpha(u_1 - u_2)^2 - \beta\left(\left|v_1 - \frac{1}{2}\right| - \left|v_2 - \frac{1}{2}\right|\right)^2\right),$$

penalizing distances in the (vertical) u axis more than in the (horizontal) v axis, and capturing the symmetry around the center.

As an example, as shown in FIG. 8, an input image 810 is received. Along the horizontal axis a first portion of the input image (e.g., the portion in which the torso appears) is replicated across the image domain as shown by 820. Namely, pixels of the first portion are mirrored along the entire image space of that horizontal axis portion. Along the horizontal axis a second portion of the input image (e.g., the portion in which the legs appear) is replicated across the image domain as shown by 822. Namely, pixels of the second portion are mirrored along the entire image space of that horizontal axis portion. In this way, if a given texture appears in a target image, that texture will be statistically modeled and made to appear in the same portion of the output image when applied to the input image. This way, for example, a shirt pattern will be visible across different poses of a target and input image.

Figure 9:
FIG. 9 presents diagrammatic representations of graphical user interfaces, in accordance with some examples.

FIG. 9 are diagrammatic representations of graphical user interfaces 900, in accordance with some examples. As shown in FIG. 9, an input image 910 is received and a target image 920 is obtained. The pose generation system 230 processes the input image 910 to generate pooling features 552. The pose generation system 230 obtains the target soft intrinsic distances from the target image 920 and unspools or generates the soft feature unpooling of the pooling features 552 using the target soft intrinsic distances from the target image 920. This generates the encoded target geometry and input appearance which is provided to the CHAIN decoder to generate the output image 930. As an example, a person in a first pose with their back to the camera is received as the input image and the target image may depict the same person in a second pose, such as a side view, with a different article of clothing, such as a shirt. The pose generation system 230 outputs the image 930 in which the person depicted in the input image 910 in a first pose is depicted in the pose of the target image 920 and with the article of clothing of the person in the target image 920.

Figure 10A:
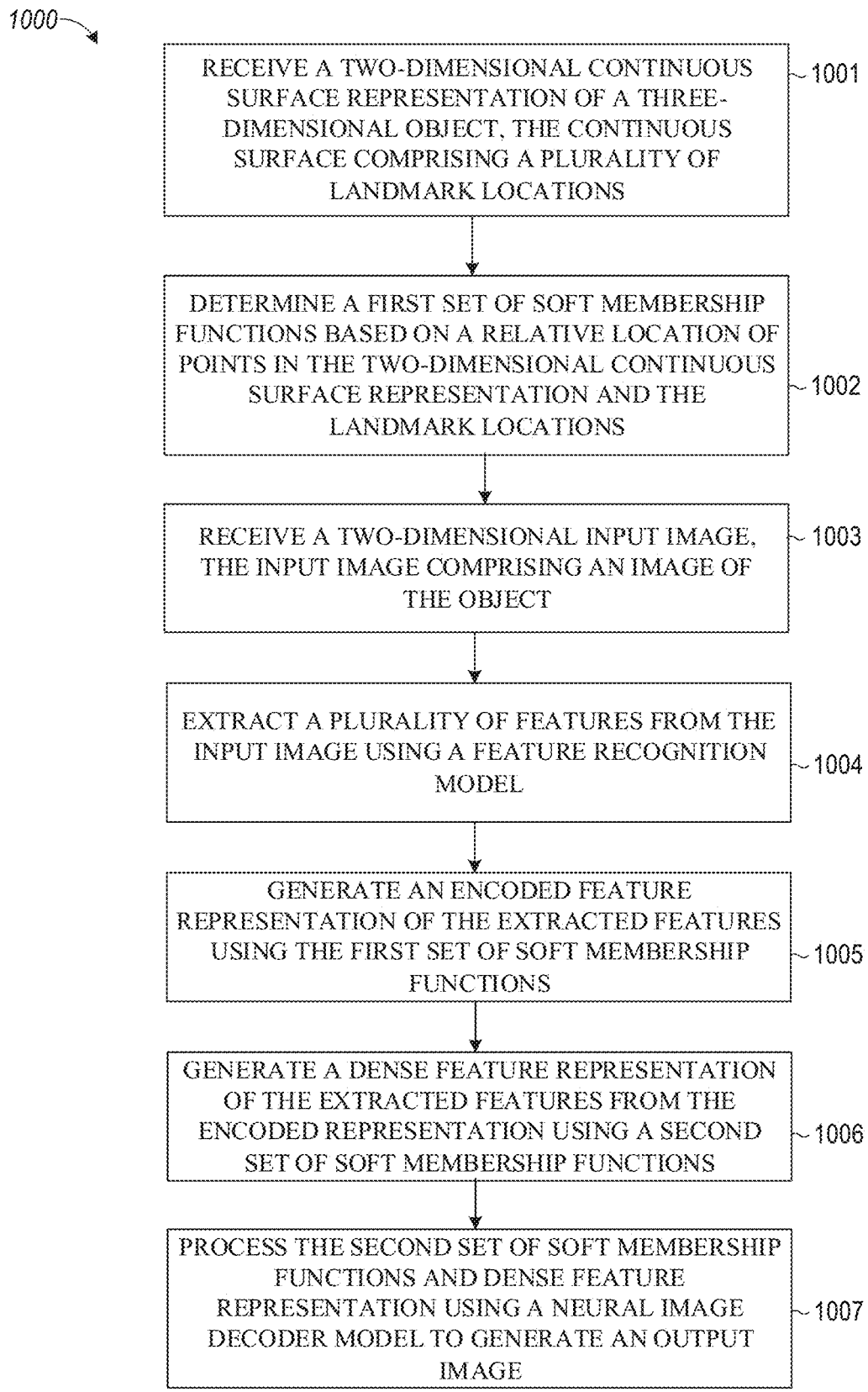
FIGS. 10A and 10B are flowcharts illustrating example operations of the messaging application server, according to examples.

FIG. 10A is a flowchart illustrating example operations of the messaging client 104 in performing process 1000, according to examples. The process 1000 may be embodied in computer-readable instructions for execution by one or more processors such that the operations of the process 1000 may be performed in part or in whole by the functional components of the messaging server system 108; accordingly, the process 1000 is described below by way of example with reference thereto. However, in other examples at least some of the operations of the process 1000 may be deployed on various other hardware configurations. The operations in the process 1000 can be performed in any order, in parallel, or may be entirely skipped and omitted.

At operation 1001, the image processing server 122 receives a two-dimensional continuous surface representation of a three-dimensional object, the continuous surface comprising a plurality of landmark locations. For example, the pose generation system 230 receives a surface coordinate representation 530 (FIG. 5).

At operation 1002, the image processing server 122 determines a first set of soft membership functions based on a relative location of points in the two-dimensional continuous surface representation and the landmark locations. For example, the pose generation system 230 computes the estimated soft intrinsic distances 540 based on an input densepose or target image.

At operation 1003, the image processing server 122 receives a two-dimensional input image, the input image comprising an image of the object. For example, the pose generation system 230 receives an input image 520.

At operation 1004, the image processing server 122 extracts a plurality of features from the input image using a feature recognition model. For example, the pose generation system 230 applies the feature extractor 550 to generate the soft feature pooling 552.

At operation 1005, the image processing server 122 generates an encoded feature representation of the extracted features using the first set of soft membership functions. For example, the pose generation system 230 generates soft feature pooling 552 using the surface coordinate representation 530.

At operation 1006, the image processing server 122 generates a dense feature representation of the extracted features from the encoded representation using a second set of soft membership functions. For example, the pose generation system 230 performs soft feature unpooling 554 using the features of the input densepose or target image (e.g., the estimated soft intrinsic distances 540).

At operation 1007, the image processing server 122 processes the second set of soft membership functions and dense feature representation using a neural image decoder model to generate an output image. For example, the pose generation system 230 uses the Adain decoder 570 to process the encoded geometry and appearance 560 information to generate an output image.

Figure 10B:
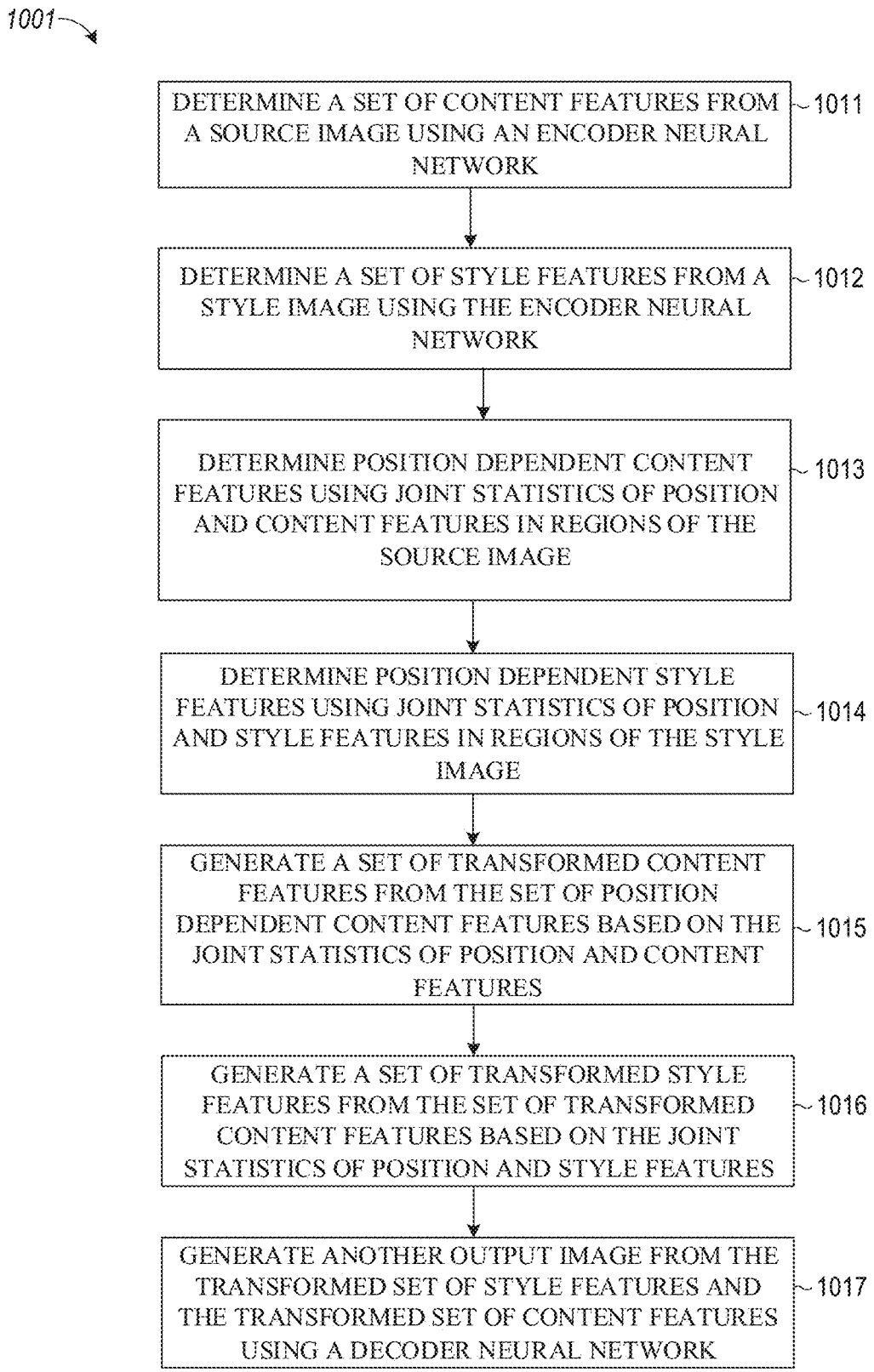

FIG. 10B is a flowchart illustrating example operations of the messaging client 104 in performing process 1000, according to examples. The process 1000 may be embodied in computer-readable instructions for execution by one or more processors such that the operations of the process 1000 may be performed in part or in whole by the functional components of the messaging server system 108; accordingly, the process 1000 is described below by way of example with reference thereto. However, in other examples at least some of the operations of the process 1000 may be deployed on various other hardware configurations. The operations in the process 1000 can be performed in any order, in parallel, or may be entirely skipped and omitted.

At operation 1011, the image processing server 122 determines a set of content features from a source image using an encoder neural network. For example, the pose generation system 230 processes an input image to generate a set of features, such as soft feature pooling 552.

At operation 1012, the image processing server 122 determines a set of style features from a style image using the encoder neural network. For example, the pose generation system 230 processes a target image to identify style features (e.g., a pattern on a shirt or pants of the image).

At operation 1013, the image processing server 122 determines position dependent content features using joint statistics of position and content features in regions of the source image. For example, the pose generation system 230 identifies regions of the source image through which style features should be replicated, such as a torso region should have features horizontally replicated but not vertically replicated. As another example, a head region is a position dependent content feature that should not have a style applied to it.

At operation 1014, the image processing server 122 determines position dependent style features using joint statistics of position and style features in regions of the style image. For example, the pose generation system 230 identifies regions of the source image through which style features should be replicated, such as a torso region should have features horizontally replicated but not vertically replicated. Specifically, each region 820 and 822 replicates the features of the style image 810 horizontally across its region.

At operation 1015, the image processing server 122 generates a set of transformed content features from the set of position dependent content features based on the joint statistics of position and content features.

At operation 1016, the image processing server 122 generates a set of transformed style features from the set of transformed content features based on the joint statistics of position and style features. For example, the pose generation system 230 applies the style of the style image in one region (e.g., the shirt region) but not another (e.g., the head region) to the source image.

At operation 1017, the image processing server 122 generates another output image from the transformed set of style features and the transformed set of content features using a decoder neural network.

Machine Architecture

Figure 11:
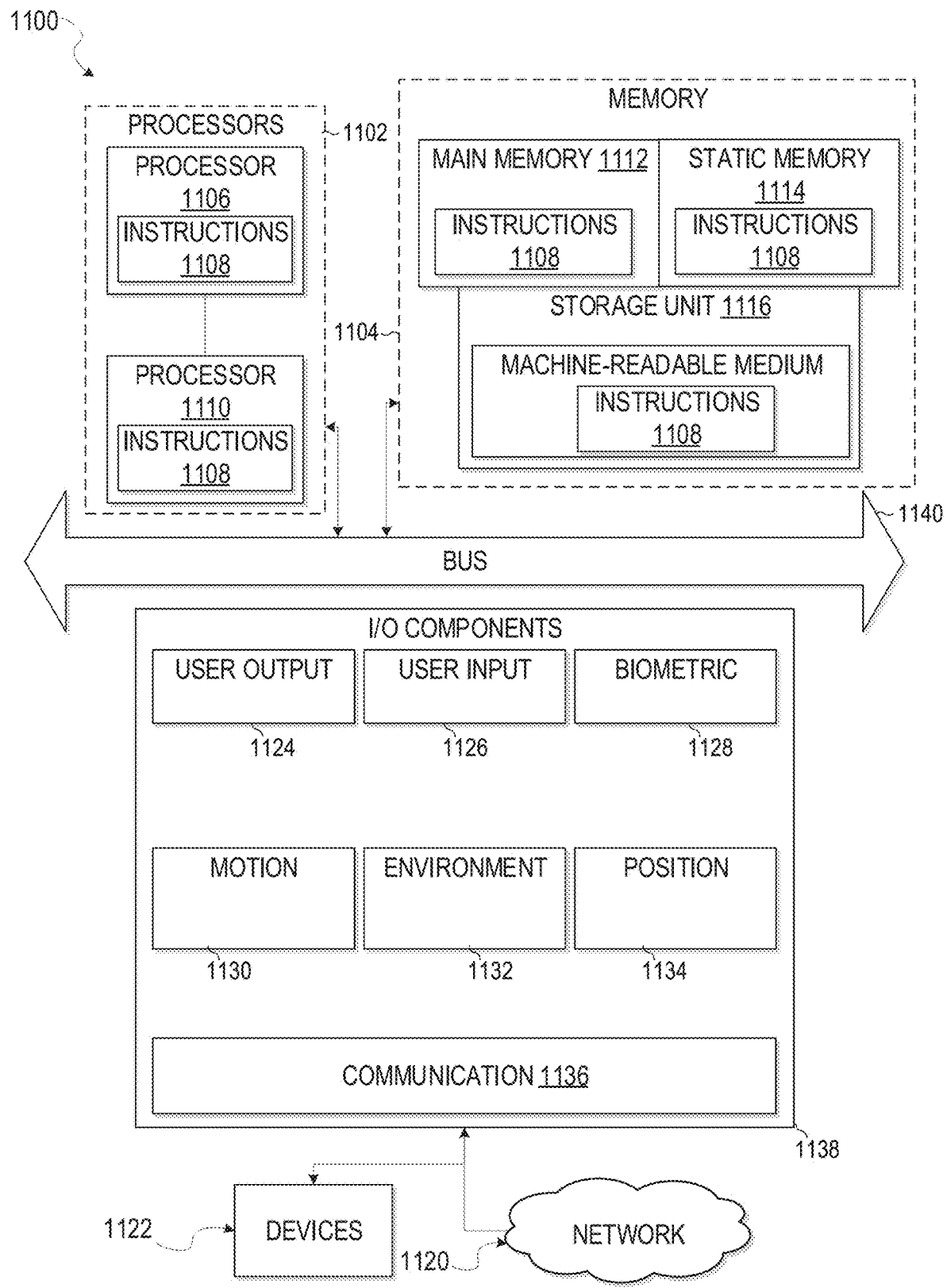
FIG. 11 is a diagrammatic representation of a machine in the form of a computer system within which a set of instructions may be executed for causing the machine to perform any one or more of the methodologies discussed herein, in accordance with some examples.

FIG. 11 is a diagrammatic representation of the machine 1100 within which instructions 1108 (e.g., software, a program, an application, an applet, an app, or other executable code) for causing the machine 1100 to perform any one or more of the methodologies discussed herein may be executed. For example, the instructions 1108 may cause the machine 1100 to execute any one or more of the methods described herein. The instructions 1108 transform the general, non-programmed machine 1100 into a particular machine 1100 programmed to carry out the described and illustrated functions in the manner described. The machine 1100 may operate as a standalone device or may be coupled (e.g., networked) to other machines. In a networked deployment, the machine 1100 may operate in the capacity of a server machine or a client machine in a server-client network environment, or as a peer machine in a peer-to-peer (or distributed) network environment. The machine 1100 may comprise, but not be limited to, a server computer, a client computer, a personal computer (PC), a tablet computer, a laptop computer, a netbook, a set-top box (STB), a personal digital assistant (PDA), an entertainment media system, a cellular telephone, a smartphone, a mobile device, a wearable device (e.g., a smartwatch), a smart home device (e.g., a smart appliance), other smart devices, a web appliance, a network router, a network switch, a network bridge, or any machine capable of executing the instructions 1108, sequentially or otherwise, that specify actions to be taken by the machine 1100. Further, while only a single machine 1100 is illustrated, the term "machine" shall also be taken to include a collection of machines that individually or jointly execute the instructions 1108 to perform any one or more of the methodologies discussed herein. The machine 1100, for example, may comprise the client device 102 or any one of a number of server devices forming part of the messaging server system 108. In some examples, the machine 1100 may also comprise both client and server systems, with certain operations of a particular method or algorithm being performed on the server-side and with certain operations of the particular method or algorithm being performed on the client-side.

The machine 1100 may include processors 1102, memory 1104, and input/output (I/O) components 1138, which may be configured to communicate with each other via a bus 1140. In an example, the processors 1102 (e.g., a Central Processing Unit (CPU), a Reduced Instruction Set Computing (RISC) Processor, a Complex Instruction Set Computing (CISC) Processor, a Graphics Processing Unit (GPU), a Digital Signal Processor (DSP), an Application Specific Integrated Circuit (ASIC), a Radio-Frequency Integrated Circuit (RFIC), another processor, or any suitable combination thereof) may include, for example, a processor 1106 and a processor 1110 that execute the instructions 1108. The term "processor" is intended to include multi-core processors that may comprise two or more independent processors (sometimes referred to as "cores") that may execute instructions contemporaneously. Although FIG. 11 shows multiple processors 1102, the machine 1100 may include a single processor with a single-core, a single processor with multiple cores (e.g., a multi-core processor), multiple processors with a single core, multiple processors with multiples cores, or any combination thereof.

The memory 1104 includes a main memory 1112, a static memory 1114, and a storage unit 1116, all accessible to the processors 1102 via the bus 1140. The main memory 1104, the static memory 1114, and the storage unit 1116 store the instructions 1108 embodying any one or more of the methodologies or functions described herein. The instructions 1108 may also reside, completely or partially, within the main memory 1112, within the static memory 1114, within machine-readable medium 1118 within the storage unit 1116, within at least one of the processors 1102 (e.g., within the processor's cache memory), or any suitable combination thereof, during execution thereof by the machine 1100.

The I/O components 1138 may include a wide variety of components to receive input, provide output, produce output, transmit information, exchange information, capture measurements, and so on. The specific I/O components 1138 that are included in a particular machine will depend on the type of machine. For example, portable machines such as mobile phones may include a touch input device or other such input mechanisms, while a headless server machine will likely not include such a touch input device. It will be appreciated that the I/O components 1138 may include many other components that are not shown in FIG. 11. In various examples, the I/O components 1138 may include user output components 1124 and user input components 1126. The user output components 1124 may include visual components (e.g., a display such as a plasma display panel (PDP), a light-emitting diode (LED) display, a liquid crystal display (LCD), a projector, or a cathode ray tube (CRT)), acoustic components (e.g., speakers), haptic components (e.g., a vibratory motor, resistance mechanisms), other signal generators, and so forth. The user input components 1126 may include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or another pointing instrument), tactile input components (e.g., a physical button, a touch screen that provides location and force of touches or touch gestures, or other tactile input components), audio input components (e.g., a microphone), and the like.

In further examples, the I/O components 1138 may include biometric components 1128, motion components 1130, environmental components 1132, or position components 1134, among a wide array of other components. For example, the biometric components 1128 include components to detect expressions (e.g., hand expressions, facial expressions, vocal expressions, body gestures, or eye-tracking), measure biosignals (e.g., blood pressure, heart rate, body temperature, perspiration, or brain waves), identify a person (e.g., voice identification, retinal identification, facial identification, fingerprint identification, or electroencephalogram-based identification), and the like. The motion components 1130 include acceleration sensor components (e.g., accelerometer), gravitation sensor components, rotation sensor components (e.g., gyroscope).

The environmental components 1132 include, for example, one or cameras (with still image/photograph and video capabilities), illumination sensor components (e.g., photometer), temperature sensor components (e.g., one or more thermometers that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment.

With respect to cameras, the client device 102 may have a camera system comprising, for example, front cameras on a front surface of the client device 102 and rear cameras on a rear surface of the client device 102. The front cameras may, for example, be used to capture still images and video of a user of the client device 102 (e.g., "selfies"), which may then be augmented with augmentation data (e.g., filters) described above. The rear cameras may, for example, be used to capture still images and videos in a more traditional camera mode, with these images similarly being augmented with augmentation data. In addition to front and rear cameras, the client device 102 may also include a 360 camera for capturing 360° photographs and videos.

Further, the camera system of a client device 102 may include dual rear cameras (e.g., a primary camera as well as a depth-sensing camera), or even triple, quad or penta rear camera configurations on the front and rear sides of the client device 102. These multiple cameras systems may include a wide camera, an ultra-wide camera, a telephoto camera, a macro camera, and a depth sensor, for example.

The position components 1134 include location sensor components (e.g., a GPS receiver component), altitude sensor components (e.g., altimeters or barometers that detect air pressure from which altitude may be derived), orientation sensor components (e.g., magnetometers), and the like.

Communication may be implemented using a wide variety of technologies. The I/O components 1138 further include communication components 1136 operable to couple the machine 1100 to a network 1120 or devices 1122 via respective coupling or connections. For example, the communication components 1136 may include a network interface component or another suitable device to interface with the network 1120. In further examples, the communication components 1136 may include wired communication components, wireless communication components, cellular communication components, Near Field Communication (NFC) components, Bluetooth® components (e.g., Bluetooth® Low Energy), Wi-Fi® components, and other communication components to provide communication via other modalities. The devices 1122 may be another machine or any of a wide variety of peripheral devices (e.g., a peripheral device coupled via a USB).

Moreover, the communication components 1136 may detect identifiers or include components operable to detect identifiers. For example, the communication components 1136 may include Radio Frequency Identification (RFID) tag reader components, NFC smart tag detection components, optical reader components (e.g., an optical sensor to detect one-dimensional bar codes such as Universal Product Code (UPC) bar code, multi-dimensional bar codes such as Quick Response (QR) code, Aztec code, Data Matrix, Dataglyph, MaxiCode, PDF417, Ultra Code, UCC RSS-2D bar code, and other optical codes), or acoustic detection components (e.g., microphones to identify tagged audio signals). In addition, a variety of information may be derived via the communication components 1136, such as location via Internet Protocol (IP) geolocation, location via Wi-Fi® signal triangulation, location via detecting an NFC beacon signal that may indicate a particular location, and so forth.

The various memories (e.g., main memory 1112, static memory 1114, and memory of the processors 1102) and storage unit 1116 may store one or more sets of instructions and data structures (e.g., software) embodying or used by any one or more of the methodologies or functions described herein. These instructions (e.g., the instructions 1108), when executed by processors 1102, cause various operations to implement the disclosed examples.

The instructions 1108 may be transmitted or received over the network 1120, using a transmission medium, via a network interface device (e.g., a network interface component included in the communication components 1136) and using any one of several well-known transfer protocols (e.g., hypertext transfer protocol (HTTP)). Similarly, the instructions 1108 may be transmitted or received using a transmission medium via a coupling (e.g., a peer-to-peer coupling) to the devices 1122.

Software Architecture

Figure 12:
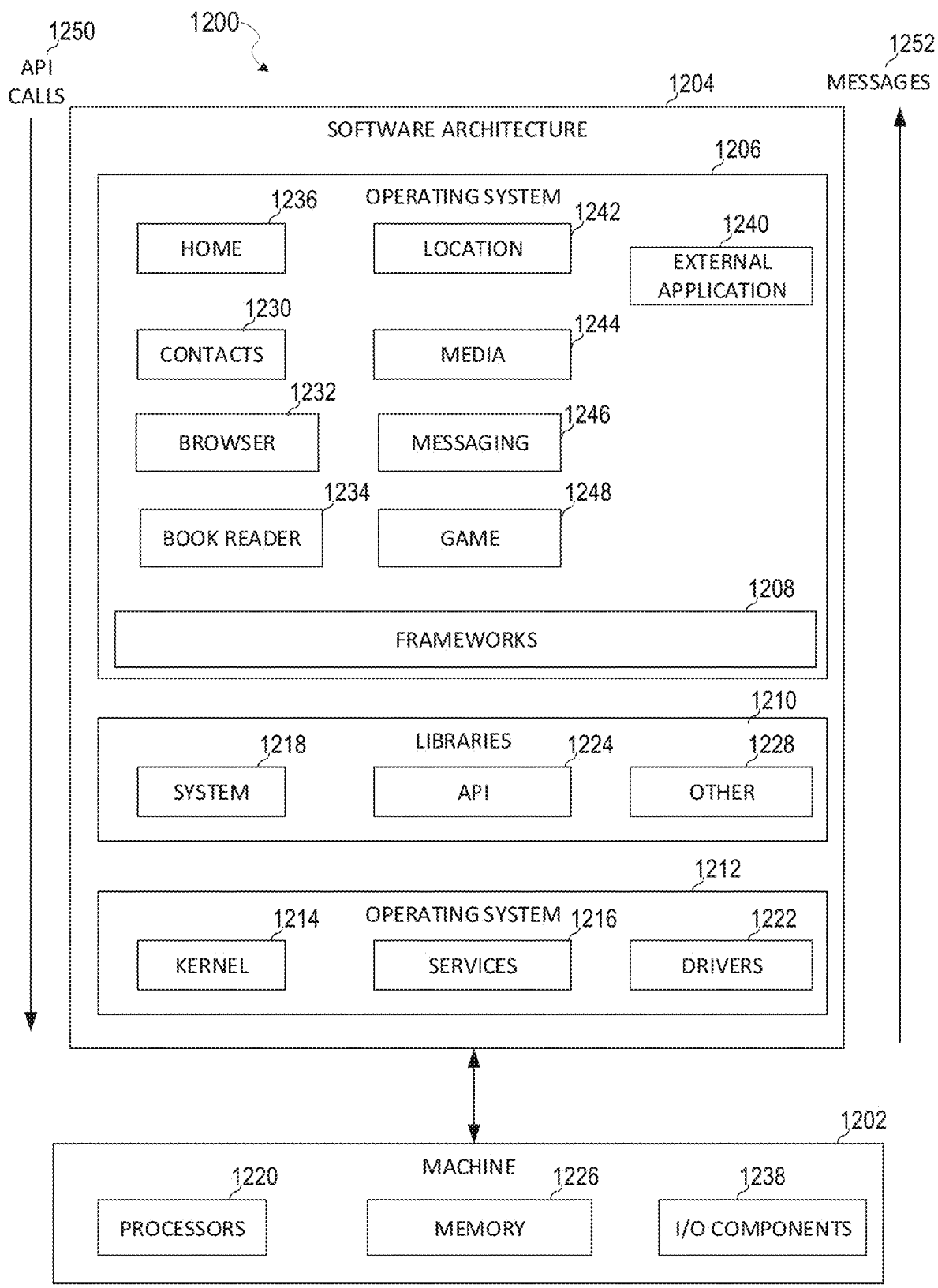
FIG. 12 is a block diagram showing a software architecture within which examples may be implemented.

FIG. 12 is a block diagram 1200 illustrating a software architecture 1204, which can be installed on any one or more of the devices described herein. The software architecture 1204 is supported by hardware such as a machine 1202 that includes processors 1220, memory 1226, and I/O components 1238. In this example, the software architecture 1204 can be conceptualized as a stack of layers, where each layer provides a particular functionality. The software architecture 1204 includes layers such as an operating system 1212, libraries 1210, frameworks 1208, and applications 1206. Operationally, the applications 1206 invoke API calls 1250 through the software stack and receive messages 1252 in response to the API calls 1250.

The operating system 1212 manages hardware resources and provides common services. The operating system 1212 includes, for example, a kernel 1214, services 1216, and drivers 1222. The kernel 1214 acts as an abstraction layer between the hardware and the other software layers. For example, the kernel 1214 provides memory management, processor management (e.g., scheduling), component management, networking, and security settings, among other functionality. The services 1216 can provide other common services for the other software layers. The drivers 1222 are responsible for controlling or interfacing with the underlying hardware. For instance, the drivers 1222 can include display drivers, camera drivers, BLUETOOTH® or BLUETOOTH® Low Energy drivers, flash memory drivers, serial communication drivers (e.g., USB drivers), WI-FI® drivers, audio drivers, power management drivers, and so forth.

The libraries 1210 provide a common low-level infrastructure used by the applications 1206. The libraries 1210 can include system libraries 1218 (e.g., C standard library) that provide functions such as memory allocation functions, string manipulation functions, mathematic functions, and the like. In addition, the libraries 1210 can include API libraries 1224 such as media libraries (e.g., libraries to support presentation and manipulation of various media formats such as Moving Picture Experts Group-4 (MPEG4), Advanced Video Coding (H.264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in a graphic content on a display), database libraries (e.g., SQLite to provide various relational database functions), web libraries (e.g., WebKit to provide web browsing functionality), and the like. The libraries 1210 can also include a wide variety of other libraries 1228 to provide many other APIs to the applications 1206.

The frameworks 1208 provide a common high-level infrastructure that is used by the applications 1206. For example, the frameworks 1208 provide various graphical user interface (GUI) functions, high-level resource management, and high-level location services. The frameworks 1208 can provide a broad spectrum of other APIs that can be used by the applications 1206, some of which may be specific to a particular operating system or platform.

In an example, the applications 1206 may include a home application 1236, a contacts application 1230, a browser application 1232, a book reader application 1234, a location application 1242, a media application 1244, a messaging application 1246, a game application 1248, and a broad assortment of other applications such as a external application 1240. The applications 1206 are programs that execute functions defined in the programs. Various programming languages can be employed to create one or more of the applications 1206, structured in a variety of manners, such as object-oriented programming languages (e.g., Objective-C, Java, or C++) or procedural programming languages (e.g., C or assembly language). In a specific example, the external application 1240 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the external application 1240 can invoke the API calls 1250 provided by the operating system 1212 to facilitate functionality described herein.

Glossary

"Carrier signal" refers to any intangible medium that is capable of storing, encoding, or carrying instructions for execution by the machine, and includes digital or analog communications signals or other intangible media to facilitate communication of such instructions. Instructions may be transmitted or received over a network using a transmission medium via a network interface device.

"Client device" refers to any machine that interfaces to a communications network to obtain resources from one or more server systems or other client devices. A client device may be, but is not limited to, a mobile phone, desktop computer, laptop, portable digital assistants (PDAs), smartphones, tablets, ultrabooks, netbooks, laptops, multi-processor systems, microprocessor-based or programmable consumer electronics, game consoles, set-top boxes, or any other communication device that a user may use to access a network.

"Communication network" refers to one or more portions of a network that may be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network may include a wireless or cellular network and the coupling may be a Code Division Multiple Access (CDMA) connection, a Global System for Mobile communications (GSM) connection, or other types of cellular or wireless coupling. In this example, the coupling may implement any of a variety of types of data transfer technology, such as Single Carrier Radio Transmission Technology (1xRTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long-range protocols, or other data transfer technology.

"Component" refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions.

Components may constitute either software components (e.g., code embodied on a machine-readable medium) or hardware components. A "hardware component" is a tangible unit capable of performing certain operations and may be configured or arranged in a certain physical manner. In various examples, one or more computer systems (e.g., a standalone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a field-programmable gate array (FPGA) or an application specific integrated circuit (ASIC). A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software), may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein.

Considering examples in which hardware components are temporarily configured (e.g., programmed), each of the hardware components need not be configured or instantiated at any one instance in time. For example, where a hardware component comprises a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In examples in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output. Hardware components may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors 1102 or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some examples, the processors or processor-implemented components may be located in a single geographic location (e.g., within a home environment, an office environment, or a server farm). In other examples, the processors or processor-implemented components may be distributed across a number of geographic locations.

"Computer-readable storage medium" refers to both machine-storage media and transmission media. Thus, the terms include both storage devices/media and carrier waves/modulated data signals. The terms "machine-readable medium," "computer-readable medium" and "device-readable medium" mean the same thing and may be used interchangeably in this disclosure.

"Ephemeral message" refers to a message that is accessible for a time-limited duration. An ephemeral message may be a text, an image, a video and the like. The access time for the ephemeral message may be set by the message sender. Alternatively, the access time may be a default setting or a setting specified by the recipient. Regardless of the setting technique, the message is transitory.

"Machine storage medium" refers to a single or multiple storage devices and media (e.g., a centralized or distributed database, and associated caches and servers) that store executable instructions, routines and data. The term shall accordingly be taken to include, but not be limited to, solid-state memories, and optical and magnetic media, including memory internal or external to processors. Specific examples of machine-storage media, computer-storage media and device-storage media include non-volatile memory, including by way of example semiconductor memory devices, e.g., erasable programmable read-only memory (EPROM), electrically erasable programmable read-only memory (EEPROM), FPGA, and flash memory devices; magnetic disks such as internal hard disks and removable disks; magneto-optical disks; and CD-ROM and DVD-ROM disks The terms "machine-storage medium," "device-storage medium," "computer-storage medium" mean the same thing and may be used interchangeably in this disclosure. The terms "machine-storage media," "computer-storage media," and "device-storage media" specifically exclude carrier waves, modulated data signals, and other such media, at least some of which are covered under the term "signal medium."

"Non-transitory computer-readable storage medium" refers to a tangible medium that is capable of storing, encoding, or carrying the instructions for execution by a machine.

"Signal medium" refers to any intangible medium that is capable of storing, encoding, or carrying the instructions for execution by a machine and includes digital or analog communications signals or other intangible media to facilitate communication of software or data. The term "signal medium" shall be taken to include any form of a modulated data signal, carrier wave, and so forth. The term "modulated data signal" means a signal that has one or more of its characteristics set or changed in such a matter as to encode information in the signal. The terms "transmission medium" and "signal medium" mean the same thing and may be used interchangeably in this disclosure.

Changes and modifications may be made to the disclosed examples without departing from the scope of the present disclosure. These and other changes or modifications are intended to be included within the scope of the present disclosure, as expressed in the following claims.

What is claimed is:

1. A computer implemented method of neural image synthesis, the method comprising:
   receiving a two-dimensional continuous surface representation of a three-dimensional object, the continuous surface comprising a plurality of landmark locations;
   determining a first set of soft membership functions based on a relative location of points in the two-dimensional continuous surface representation and the landmark locations;
   receiving a two-dimensional input image, the input image comprising an image of the object;
   extracting a plurality of features from the input image using a feature recognition model;
   generating an encoded feature representation of the extracted features using the first set of soft membership functions;
   generating a dense feature representation of the extracted features from the encoded representation using a second set of soft membership functions;

processing the second set of soft membership functions and dense feature representation using a neural image decoder model to generate an output image; and causing presentation of the output image on a client device.

2. The method of claim 1, wherein determining the first set of soft membership functions comprises:
determining distances between a plurality of points in the two-dimensional continuous surface representation and the landmark locations; and
assigning each point in the plurality of points to a landmark based on the determined distances.

3. The method of claim 1, further comprising determining the landmark locations using a landmark recognition model.

4. The method of claim 1, wherein the neural image decoder model comprises a convolutional neural network conditioned on the two-dimensional continuous surface representation.

5. The method of claim 1, wherein generating an encoded feature representation of the extracted features using the first set of soft membership functions comprises performing a membership-weighted estimate of a mean and variance for each channel of the extracted features.

6. The method of claim 5, wherein generating a dense feature representation of the extracted features from the encoded representation using a second set of soft membership functions comprises applying a dual operation to the membership-weighted estimate of a mean and variance for each channel of the extracted features.

7. The method of claim 1, wherein the object is a human body and wherein the landmarks comprise joints of the human body.

8. The method of claim 1, wherein the first set of soft membership functions and the second set of soft membership functions are the same.

9. The method of claim 8, further comprising:
generating a three-dimensional model of the three-dimensional object from the input image; and
generating the two-dimensional continuous surface representation from the three-dimensional model.

10. The method of any of claim 9, further comprising modifying values in the encoded representation prior to generating the dense feature representation.

11. The method of claim 1, wherein the two-dimensional continuous surface representation of a three-dimensional object is generated from the input image, and wherein the method further comprises:
receiving a further two-dimensional input image, the further input image comprising a further object of the same type as the three-dimensional object;
generating a further two-dimensional continuous surface representation of said three-dimensional object from the further two-dimensional input image, the further continuous surface comprising the plurality of landmark locations; and
determining the second set of soft membership functions based on relative locations of points in the further two-dimensional continuous surface representation and the landmark locations.

12. The method of claim 11, wherein the input image comprises an image of the object in a first pose and the further input image comprises an image of the further object in a second pose, wherein the second image comprises portions corresponding to unseen portions of the first image; and
wherein generating the two-dimensional continuous surface representation from the input image comprises generating portions of the two-dimensional continuous surface representation corresponding to the unseen portions of the first image from the encoded representation using a learned attention mechanism.

13. The method of claim 12, wherein the learned attention mechanism is based on the first set of soft membership functions.

14. The method of claim 1, further comprising:
determining a set of content features from a source image using an encoder neural network;
determining a set of style features from a style image using the encoder neural network;
determining position dependent content features using joint statistics of position and content features in regions of the source image;
determining position dependent style features using joint statistics of position and style features in regions of the style image;
generating a set of transformed content features from the set of position dependent content features based on the joint statistics of position and content features;
generating a set of transformed style features from the set of transformed content features based on the joint statistics of position and style features; and
generating another output image from the transformed set of style features and the transformed set of content features using a decoder neural network.

15. The method of claim 14, further comprising combining the output image with the another output image to generate a combined image.

16. The method of claim 14, wherein the joint statistics of position and content features comprise a content feature mean, a content position mean and covariances between content features and content positions, and wherein determining position dependent content features comprises determining a conditional model of the content features conditioned on position.

17. The method of claim 16, wherein the conditional model of the content features comprises a position dependent content mean and a conditional content covariance.

18. The method of claim 17, wherein generating the set of transformed content features from the set of position dependent content features comprises:
centring the position dependent content features based on the position dependent content mean; and
applying a whitening transformation based on the conditional content covariance.

19. A system for neural image analysis, comprising:
a processor configured to perform operations comprising:
receiving a two-dimensional continuous surface representation of a three-dimensional object, the continuous surface comprising a plurality of landmark locations;
determining a first set of soft membership functions based on a relative location of points in the two-dimensional continuous surface representation and the landmark locations;
receiving a two-dimensional input image, the input image comprising an image of the object;
extracting a plurality of features from the input image using a feature recognition model;
generating an encoded feature representation of the extracted features using the first set of soft membership functions;
generating a dense feature representation of the extracted features from the encoded representation using a second set of soft membership functions;

processing the second set of soft membership functions and dense feature representation using a neural image decoder model to generate an output image; and causing presentation of the output image on a client device.

20. A non-transitory machine-readable storage medium that includes instructions that, when executed by one or more processors of a machine, cause the machine to perform operations for neural image analysis comprising:

receiving a two-dimensional continuous surface representation of a three-dimensional object, the continuous surface comprising a plurality of landmark locations;

determining a first set of soft membership functions based on a relative location of points in the two-dimensional continuous surface representation and the landmark locations;

receiving a two-dimensional input image, the input image comprising an image of the object;

extracting a plurality of features from the input image using a feature recognition model;

generating an encoded feature representation of the extracted features using the first set of soft membership functions;

generating a dense feature representation of the extracted features from the encoded representation using a second set of soft membership functions;

processing the second set of soft membership functions and dense feature representation using a neural image decoder model to generate an output image; and causing presentation of the output image on a client device.

* * * * *